United States Patent
Cheeran et al.

(10) Patent No.: US 12,497,444 B2
(45) Date of Patent: Dec. 16, 2025

(54) **ANTIBODIES FOR DETECTION OF *MYCOPLASMA HYOPNEUMONIAE* AND METHODS OF MAKING AND USING SAME**

(71) Applicant: REGENTS OF THE UNIVERSITY OF MINNESOTA, Minneapolis, MN (US)

(72) Inventors: Maxim Chacko-Joseph Cheeran, Apple Valley, MN (US); Venkatramana Divana Krishna Bhat, St. Paul, MN (US); Maria Graciela Pieters Silva, Arden Hills, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 486 days.

(21) Appl. No.: 17/944,312

(22) Filed: Sep. 14, 2022

(65) Prior Publication Data
US 2023/0088895 A1 Mar. 23, 2023

Related U.S. Application Data

(60) Provisional application No. 63/243,818, filed on Sep. 14, 2021.

(51) Int. Cl.
*A61K 39/395* (2006.01)
*C07K 16/12* (2006.01)
*G01N 33/569* (2006.01)

(52) U.S. Cl.
CPC ... *C07K 16/1253* (2013.01); *G01N 33/56933* (2013.01); *C07K 2317/24* (2013.01); *C07K 2317/33* (2013.01); *C07K 2317/565* (2013.01); *G01N 2469/10* (2013.01); *G01N 2470/04* (2021.08)

(58) Field of Classification Search
None
See application file for complete search history.

(56) References Cited

U.S. PATENT DOCUMENTS 4,741,900 A 5/1988 Alvarez et al.

OTHER PUBLICATIONS

Kussie et al (Journal of Immunology, 152:146-152, 1994).*
Rudikoff et al (PNAS 79:1979-1983, 1982).*
Bendig (Methods: A Companion to Methods in Enzymology 1995; 8:83-93).*
Paul, Fundamental Immunology, 3rd Edition, 1993, pp. 292-295, under the heading "Fv Structure and Diversity in Three Dimensions").*
Chen et al, (The EMBO Journal, 14(12):2784-2794, 1995).*
Cheeran, M., "Developing Multiplex Giant Magnetoresistance (GMR) Biosensors for the Detection of Swine Respiratory Pathogens," Grant Abstract, Grant No. 2020-67021-31956 [online]. National Institute of Food and Agriculture, USDA, project dates Oct. 17, 2017 to Mar. 30, 2020 [retrieved on Sep. 10, 2020]. Retrieved from the Internet:<URL: https://cris.nifa.usda.gov/cgi-bin/starfinder/48394/crisassist.txt>; 4 pgs.
Cheikh Saad Bouh et al., Monoclonal antibodies to *Escherichia coli*-expressed P46 and P65 membranous proteins for specific immunodetection of Mycoplasma hyopneumoniae in lungs of infected pigs. Clin Diagn Lab Immunol 10, 459-468 (2003).
Chothia et al., Canonical structures for the hypervariable regions of immunoglobulins. *J Mol Biol* 196, 901-917 (1987).
Feld et al., A monoclonal blocking ELISA detecting serum antibodies to Mycoplasma hyopneumoniae. Vet Microbiol 30, 35-46 (1992).
Jones et al., Replacing the complementarity-determining regions in a human antibody with those from a mouse. Nature 321, 522-525 (1986).
Kabat, Sequences of Proteins of Immunological Interest, 5th Edition, U.S. Department of Health and Human Services, NIH Publication No. 91-3242. 1991. Cover page, table of contents.
Krishna et al., Nanotechnology: Review of concepts and potential application of sensing platforms in food safety. Food Microbiol 75, 47-54 (2018).
Krishna et al., Poster titled "Development of monoclonal antibodies specific to Mycoplasma hyopneumoniae" Presented at Points of Pride Research Day at the University of Minnesota, College of Veterinary Medicine in St. Paul, Minnesota on Oct. 2, 2019; 1 page.
Krishna et al., Oral Presentation titled "Development of monoclonal antibodies specific to Mycoplasma hyopneumoniae" Allen D. Leman Swine Conference at the University of Minnesota in St. Paul, Minnesota, Sep. 14-17, 2019; 1 page Abstract.
Kohler et al., Derivation of specific antibody-producing tissue culture and tumor lines by cell fusion. *Eur J Immunol* 6, 511-519 (1976).
Le Potier et al., A blocking ELISA using a monoclonal antibody for the serological detection of Mycoplasma hyopneumoniae. Res Vet Sci 56, 338-345 (1994).
Liu et al., Development of a blocking ELISA for detection of Mycoplasma hyopneumoniae infection based on a monoclonal antibody against protein P65. J Vet Med Sci 78, 1319-1322 (2016).
Singer, "Optimal humanization of 1B4, an anti-CD18 murine monoclonal antibody, is achieved by correct choice of human V-region framework sequences" 1993 *J. Immunol.*, 150(7):2844-57.
Su et al., Detection of Influenza a Virus in Swine Nasal Swab Samples With a Wash-Free Magnetic Bioassay and a Handheld Giant Magnetoresistance Sensing System. *Front Microbiol* 10, 1077 (2019).
Wong et al., Poster titled "Optimization of ELISA Test for Mycoplasma Hyopneumoniae" Scholar's forum presentation at Wayzata High School in Plymouth, Minnesota on Apr. 22, 2020; 1 page.
Wu et al., Portable GMR Handheld Platform for the Detection of Influenza A Virus. *ACS Sens* 2, 1594-1601 (2017).

(Continued)

*Primary Examiner* — Jennifer E Graser
(74) *Attorney, Agent, or Firm* — Mueting Raasch Group

(57) ABSTRACT

Antibodies that detect *M. hyopneumoniae*, methods of making those antibodies, and methods of using those antibodies including, for example, in a diagnostic immunoassay, are described. Such a diagnostic assay may be used in pen-side testing for detection of *M. hyopneumoniae*.

15 Claims, 11 Drawing Sheets

Specification includes a Sequence Listing.

(56) References Cited

OTHER PUBLICATIONS

Wu et al., Magnetic Particle Spectroscopy for Detection of Influenza A Virus Subtype H1N1. *ACS Appl Mater Interfaces* 12, 13686-13697 (2020).

* cited by examiner (B)

(A)

ANTIBODIES FOR DETECTION OF *MYCOPLASMA HYOPNEUMONIAE* AND METHODS OF MAKING AND USING SAME

CROSS-REFERENCE TO RELATED APPLICATION

This application claims the benefit of U.S. Provisional Patent Application No. 63/243,818, filed Sep. 14, 2021, which is incorporated herein by reference in its entirety.

GOVERNMENT FUNDING

This invention was made with government support under 2020-67021-31956 awarded by the National Institute of Food and Agriculture, USDA. The government has certain rights in the invention.

SEQUENCE LISTING

This application contains a Sequence Listing electronically submitted to the United States Patent and Trademark Office via Patent Center as an XML file entitled "0110-000665US01" having a size of 10 kilobytes and created on Sep. 13, 2022. Due to the electronic filing of the Sequence Listing, the electronically submitted Sequence Listing serves as both the paper copy required by 37 CFR § 1.821(c) and the CRF required by § 1.821(e). The information contained in the Sequence Listing is incorporated by reference herein.

SUMMARY

This disclosure describes antibodies that detect *M. hyopneumoniae*. This disclosure further describes methods of making those antibodies and of using those antibodies including, for example, in a diagnostic immunoassay. Such a diagnostic assay may be used in pen-side testing for detection of *M. hyopneumoniae*.

In one aspect, the antibody includes one or more complementary determining regions (CDRs) of the heavy chain variable region of MAb 2C9.B3, one or more CDR of the light chain variable region of MAb 2C9.B3, or both one or more complementary determining regions (CDRs) of the heavy chain variable region of MAb 2C9.B3 and or more CDR of the light chain variable region of MAb 2C9.B3.

In another aspect, the antibody includes one or more complementary determining regions (CDRs) of the heavy chain variable region of 4G11.A3, one or more CDR of the light chain variable region of 4G11.A3, or both one or more complementary determining regions (CDRs) of the heavy chain variable region of MAb 4G11.A3 and or more CDR of the light chain variable region of MAb 4G11.A3.

In one or more embodiments of either aspect, the antibody is humanized.

In one or more embodiments of either aspect, the antibody is an antibody fragment.

In one or more embodiments of either aspect, the antibody is an IgG antibody.

In one or more embodiments of either aspect, the antibody is a monoclonal antibody.

In one or more embodiments of either aspect, the antibody is a chimeric antibody.

In another aspect, this disclosure describes a composition that includes an antibody that detects *M. hyopneumoniae*.

In another aspect, this disclosure describes a kit that includes an antibody that detects *M. hyopneumoniae*.

In another aspect, this disclosure describes a method that includes using the antibody that detects *M. hyopneumoniae* in an in vitro or in vivo diagnostic or therapeutic method.

In one or more embodiments, the method includes detecting the presence of *M. hyopneumoniae* in a subject.

In one or more embodiments, the method includes detecting of *M. hyopneumoniae* in a sample obtained from a subject.

In one or more embodiments, the method includes performing a magnetic bioassay or enzyme-linked immunosorbent assay (ELISA).

In one or more embodiments, the method includes detecting a change in the magnetoresistance ratio (AMR) from a giant magnetoresistance (GMR) sensor.

The above summary is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Figure 1:
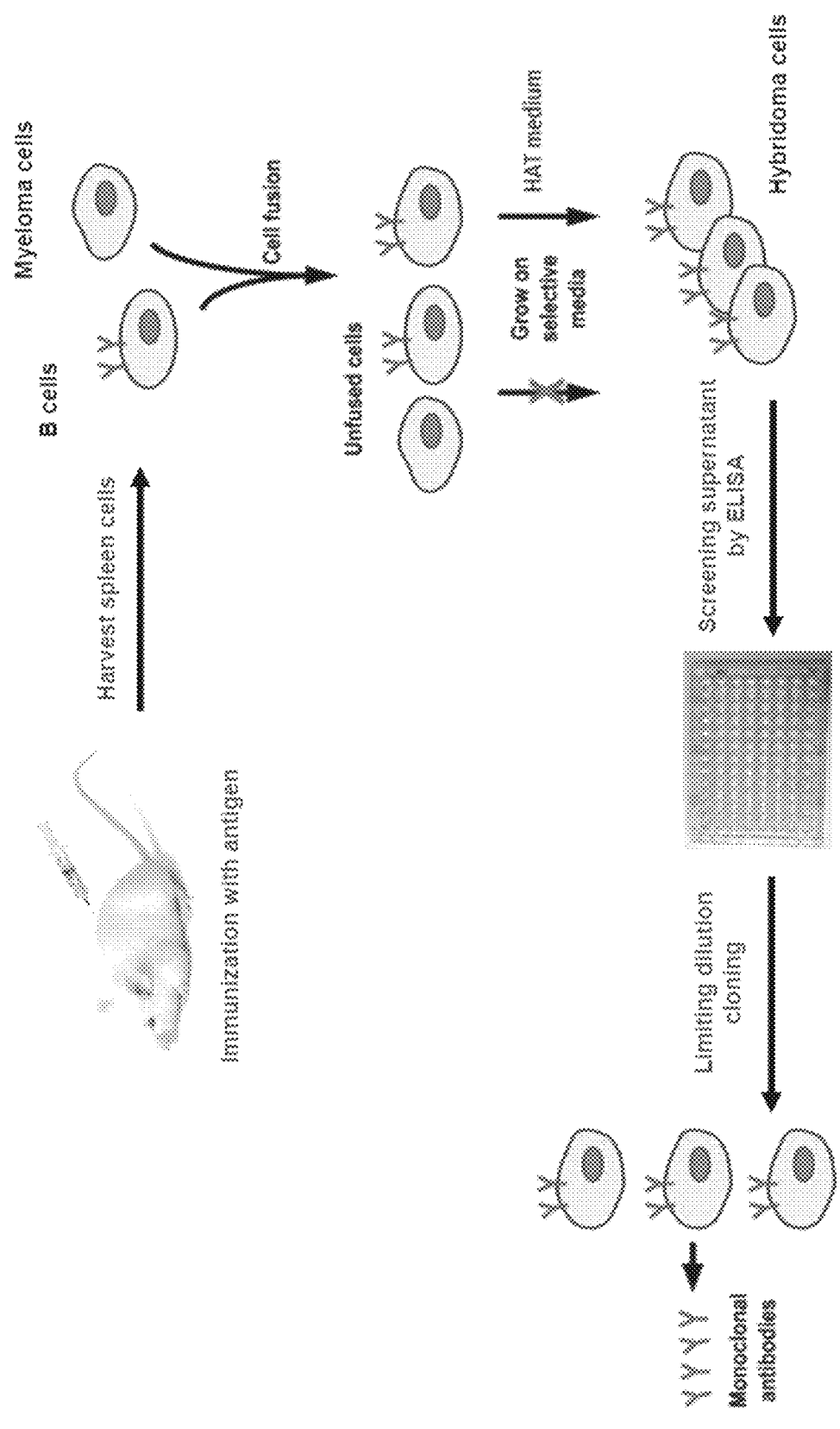
FIG. 1 shows a schematic of a monoclonal antibody development process by hybridoma. Hybridoma cells formed by fusion of antibody-producing cells and myeloma cells are selected by HAT medium. These hybrid cells are screened by ELISA to determine specific antibody secreting clones and sub-cloned by limiting dilution.

FIG. 7 shows a portable hand-held giant magnetoresistance (GMR) diagnostic platform and exemplary schematic and results of a magnetic sandwich assay that could be used for *M. hyopneumoniae* detection. (A) Real-time data collection and data transmission may either be done wirelessly thorough Bluetooth to a smartphone, a tablet, or a laptop or through USB connection to a desktop computer. (B) Exemplary components of hand-held detection platform. (C) An exemplary fabricated GMR chip. (D) A schematic representation of a magnetic sandwich assay, MACS indicates an exemplary magnetic nanoparticle, available from Miltenyi Biotech (Bergisch Gladbach, Germany). (E) Real-time binding curves for targeted binding of different concentrations of target. In this exemplary example, binding curves for influenza A virus (IAV) H3N2v are shown. (F) Average signal from different concentrations of IAV H3N2v at 10 minutes after sample addition.

FIG. 8. Specific reactivity of monoclonal antibody 4G11.A3 to *M. hyopneumoniae* determined by sandwich ELISA. Microtiter wells were coated with purified Mab 4G11.A3. Whole cell lysate of indicated *Mycoplasma* species or other common swine respiratory pathogens—*Streptococcus suis, Pasturella multocida, Porcine reproductive* and respiratory syndrome virus (PRRSv) isolate VR2332, Influenza A virus (IAV) H1N1, and IAV H3N2 were allowed to react with coated Mab 4G11.A3. Bound proteins were detected using rabbit polyclonal antibody to *M. hyopneumoniae* followed by goat anti-rabbit IgG-HRP conjugate and $TMB/H_2O_2$ substrate. Dotted line indicates the cut off value. p FIG. 9. Concentration curve of *Mycoplasma hyopneumoniae* detection by sandwich ELISA using MAb4G11.A3 as capture antibody. Microtiter wells were coated with purified Mab 4G11.A3. Whole cell lysate of *M. hyopneumoniae* was serially diluted two-fold in PBS and added to the wells. After washing, bound proteins were detected using rabbit polyclonal antibody to *M. hyopneumoniae* followed by goat anti-rabbit IgG-HRP conjugate and $TMB/H_2O_2$ substrate. Dotted line indicates the cut off value.

FIG. 10. Concentration curve of *M. hyopneumoniae* detection in nasal swab sample by sandwich ELISA using MAb4G11.A3 as capture antibody. Microtiter wells were coated with purified Mab 4G11.A3. Whole cell lysate of *Mycoplasma hyopneumoniae* was serially diluted two-fold in pooled nasal swab sample of pigs negative for *M. hyopneumoniae* and added to the wells. After washing, bound proteins were detected using rabbit polyclonal antibody to *M. hyopneumoniae* followed by goat anti-rabbit IgG-HRP conjugate and $TMB/H_2O_2$ substrate. Dotted line indicates the cut off value.

FIG. 11. Sandwich ELISA using MAb4G11.A3 detected *M. hyopneumoniae* in tracheal swab of experimentally infected pigs. Pigs were experimentally infected with *M. hyopneumoniae*. At 0 day post infection (dpi) and 28 dpi, tracheal swab was collected and tested using ELISA.

DETAILED DESCRIPTION OF ILLUSTRATIVE EMBODIMENTS

This disclosure describes antibodies that bind to *M. hyopneumoniae*. This disclosure further describes methods of making those antibodies and of using those antibodies including, for example, in a diagnostic immunoassay. Such a diagnostic assay may be used in pen-side testing for detection of *M. hyopneumoniae*.

As further described herein, the antibodies that bind to *M. hyopneumoniae* may be used for the detection of *M. hyopneumoniae*. Using antibodies that bind to *M. hyopneumoniae* is more accurate than existing diagnostic assays for *M. hyopneumoniae* that detect serum antibodies. Moreover, using antibodies that bind to *M. hyopneumoniae* (particularly in the context of, for example, a kit) is easier than existing diagnostic assays for *M. hyopneumoniae* that use PCR to detect the bacterial genome; in contrast to PCR, a kit that include antibodies that bind to *M. hyopneumoniae* requires no specialized expertise.

Antibodies

In one aspect, this disclosure describes antibodies that bind to *M. hyopneumoniae*. As used herein, the term "antibody" refers generally an immunoglobulin or a fragment thereof. Thus, as used herein, the term "antibody" encompasses not only immunoglobulins with an intact Fc region, but also antibody fragments capable of binding to a biological molecule (such as an antigen or receptor) or a portion thereof, including but not limited to Fab, Fab', $F(ab')_2$, pFc', Fd, Fd', Fv, dAB, a single domain antibody (sdAb), a variable fragment (Fv), a single-chain variable fragment (scFv) or a disulfide-linked Fv (sdFv), a diabody or a bivalent diabody, a linear antibody, a single-chain antibody molecule, or a multispecific antibody (e.g., a tribody) formed from antibody fragments. The antibody can be of any type (e.g., IgG, IgE, IgM, IgD, IgA and IgY), class (e.g., IgG1, IgG2, IgG3, IgG4, IgA1 and IgA2), or subclass.

In one or more embodiments, the antibody can be a humanized antibody derived from an animal single domain antibody. While an scFv has a heavy variable chain component and a light variable chain component joined by a flanking sequence, a single domain antibody consists of a single monomeric variable chain—i.e., a variable heavy chin or a variable light chain—that is capable of specifically engaging a target. A single domain antibody may be derived from an antibody of any suitable animal such as, for example, a camelid (e.g., a llama or camel) or a cartilaginous fish (e.g., a wobbegong or a nurse shark). A single domain antibody can provide superior physical stability, an ability to bind deep grooves, and increased production yields compared to larger antibody fragments.

In one or more embodiments, an antibody that binds to *M. hyopneumoniae* is a monoclonal antibody. In one or more embodiments, antibodies that bind to *M. hyopneumoniae* include monoclonal antibodies produced by the hybridoma cell lines (also referred to herein as clones) 2C9.B3 or 4G11.A3; such antibodies are also referred to herein as MAb 2C9.B3 (or MAb2) and MAb 4G11.A3 (or MAb4), respectively.

In one or more embodiments, an antibody that binds to *M. hyopneumoniae* preferably does not bind to other commensal or pathogenic species of swine *Mycoplasma*. For example, in one or more embodiments, an antibody that binds to *M. hyopneumoniae* preferably does not bind to *M. hyorhinis* or *M. flocculare*.

In one or more embodiments, the antibody is an isolated antibody. In one or more embodiments, the antibodies may be isolated or purified by conventional immunoglobulin purification procedures, such as protein A-Sepharose chromatography, protein G-Sepharose chromatography, hydroxyapatite chromatography, gel electrophoresis, dialysis, or affinity chromatography.

In one or more embodiments, an antibody that binds to *M. hyopneumoniae* may include a derivative of an antibody that is modified or conjugated by the covalent attachment of any type of molecule to the antibody. Such antibody derivatives include, for example, antibodies that have been modified by glycosylation, acetylation, PEGylation, phosphorylation, amidation, derivatization by known protecting/blocking groups, proteolytic cleavage, toxins, or linkage to a cellular ligand or other protein. Any of numerous chemical modifications may be carried out by known techniques, including, but not limited to, specific chemical cleavage, acetylation, formylation, and metabolic synthesis of tunicamycin. Additionally, the derivatives may contain one or more non-classical amino acids.

An antibody that binds to *M. hyopneumoniae* may be coupled directly or indirectly to a detectable marker by techniques well known in the art. A detectable marker is an agent detectable using, for example, spectroscopic, photo-chemical, biochemical, immunochemical, or chemical methods. Useful detectable markers include, but are not limited to, magnetic nanoparticles, magnetic microbeads, fluorescent dyes and materials, chemiluminescent compounds and materials, bioluminescent materials, electron-dense reagents, enzymes, coenzymes, colored particles, biotin, digoxigenin, or radioactive materials that include a radio-isotope. A detectable marker may generate a measurable signal, such as radioactivity, fluorescent light, color, or enzyme activity. Antibodies conjugated to detectable markers may be used for diagnostic or therapeutic purposes. The detectable marker may be coupled or conjugated either directly to the antibody or indirectly, through an intermediate such as, for example, a linker known in the art, using techniques known in the art. See, for example, U.S. Pat. No. 4,741,900, describing the conjugation of metal ions to antibodies for diagnostic use. Examples of suitable enzymes include horseradish peroxidase, alkaline phosphatase, beta-galactosidase, and acetylcholinesterase; examples of suitable prosthetic group complexes include streptavidin/biotin and avidin/biotin; examples of suitable fluorescent materials include umbelliferone, fluorescein, fluorescein isothiocyanate, rhodamine, dichlorotriazinylamine fluorescein, dansyl chloride and phycoerythrin; an example of a luminescent material includes luminol; examples of bioluminescent materials include luciferin, and aequorin; and examples of suitable radioactive material include iodine ($^{121}$I, $^{123}$I, $^{125}$I, $^{131}$I), carbon ($^{14}$C), sulfur ($^{35}$S), tritium ($^{3}$H), indium ($^{111}$In, $^{112}$In, $^{113}$mIn, $^{115}$mIn), technetium ($^{99}$Tc, $^{99}$mTc), thallium ($^{201}$Ti) gallium ($^{68}$Ga, $^{67}$Ga), palladium ($^{103}$Pd), molybdenum ($^{99}$Mo), xenon ($^{133}$Xe), fluorine ($^{18}$F), $^{153}$Sm, $^{177}$Lu, $^{159}$Gd, $^{149}$Pm, $^{140}$La, $^{175}$Yb, $^{166}$Ho, $_{90}$Y, $^{47}$Sc, $^{186}$Re, $^{188}$Re, $^{142}$Pr, $^{105}$Rh, and $^{97}$Ru. Techniques for conjugating such moieties to antibodies are well-known.

In an exemplary embodiment, the antibody may be conjugated to biotin. In another exemplary embodiment, the antibody may be directly or indirectly conjugated to a magnetic nanoparticle, such as MACS, streptavidin-coated superparamagnetic microbeads, available from Miltenyi Biotech (Bergisch Gladbach, Germany) and Miltenyi Biotec, Inc. (Auburn, California). For example, as shown in FIG. 7D, the antibody may be conjugated to biotin which allows binding to a streptavidin-conjugated magnetic microbead.

Also included in the present disclosure are monoclonal antibodies produced by progeny or derivatives of these hybridoma cell lines, monoclonal antibodies produced by equivalent or similar hybridoma cell lines, and/or recombinant derivatives made thereof. In one or more embodiments, an antibody that binds to *M. hyopneumoniae* includes a recombinantly derived monoclonal that includes one or more complementarity determining regions (CDRs) of MAb 2C9.B3 or MAb 4G11.A3.

An intact antibody molecule has two heavy (H) chain variable regions (abbreviated herein as $V_H$) and two light (L) chain variable regions (abbreviated herein as $V_L$). The $V_H$ and $V_L$ regions may be further subdivided into regions of hypervariability, termed "complementarity determining regions" ("CDRs"), interspersed with regions that are more conserved, termed "framework regions" ("FRs"). The extent of the FRs and CDRs has been precisely defined (see, Kabat et al. (1991) Sequences of Proteins of Immunological Interest, Fifth Edition, U.S. Department of Health and Human Services, NIH Publication No. 91-3242, and Chothia et al. (1987) *J. Mol. Biol.* 196: 901-917). Each $V_H$ and $V_L$ is composed of three CDRs and four FRs, arranged from amino-terminus to carboxy-terminus in the following order: FR1, CDR1, FR2, CDR2, FR3, CDR3, FR4.

In one or more embodiments, an antibody that binds to *M. hyopneumoniae* includes the $V_H$ domain of the monoclonal antibody produced by hybridoma cell line 2C9.B3 (MAb 2C9.B3; SEQ ID NO:2) or the $V_H$ domain of the monoclonal antibody produced by hybridoma cell line 4G11.A3 (MAb 4G11.A3; SEQ ID NO:6). In one or more embodiments, an antibody that binds to *M. hyopneumoniae* includes the $V_L$ domain of the monoclonal antibody produced by hybridoma cell line 2C9.B3 (MAb 2C9.B3; SEQ ID NO:4) or the $V_L$ domain of the monoclonal antibody produced by hybridoma cell line 4G11.A3 (MAb 4G11.A3; SEQ ID NO:8). In one or more embodiments, an antibody that binds to *M. hyopneumoniae* includes the $V_H$ domain and the $V_L$ domain of MAb 2C9.B3 or the $V_H$ domain and the $V_L$ domain of MAb 4G11.A3. In one or more embodiments, an antibody that binds to *M. hyopneumoniae* may contain one, two, three, four, five, six, or more amino acid substitutions compared to the amino acid sequences of the $V_H$ domains and/or the $V_L$ domains identified above wherein the amino acid substitutions do not substantially affect binding of the antibody to *M. hyopneumoniae*. The amino acid substitutions may occur in the FRs or the CDRs.

In one or more embodiments, an antibody that binds to *M. hyopneumoniae* includes at least one CDR of the $V_H$ domain of MAb 2C9.B3 (amino acids 50-54 of SEQ ID NO:2, amino acids 69-84 of SEQ ID NO:2, or amino acids 117-126 of SEQ ID NO:2) or at least one CDR of the $V_H$ domain of MAb 4G11.A3 (amino acids 50-54 of SEQ ID NO:6, amino acids 69-85 of SEQ ID NO:6, or amino acids 118-132 of SEQ ID NO:6). In one or more embodiments, an antibody that binds to *M. hyopneumoniae includes* at least two CDRs of the $V_H$ domain of MAb 2C9.B3 or at least two CDRs of the $V_H$ domain of MAb 4G11.A3. In one or more embodiments, an antibody that binds to *M. hyopneumoniae* includes all three CDRs of the $V_H$ domain of MAb 2C9.B3 or all three CDRs of the $V_H$ domain of MAb 4G11.A3.

Additionally or alternatively, in one or more embodiments, an antibody that binds to *M. hyopneumoniae* includes at least one CDR of the $V_L$ domain of MAb 2C9.B3 (amino acids 44-54 of SEQ ID NO:4, amino acids 70-76 of SEQ ID NO:4, or amino acids 109-117 of SEQ ID NO:4) or at least one CDR of the $V_L$ domain of MAb 4G11.A3 (amino acids 46-55 of SEQ ID NO:8, amino acids 71-77 of SEQ ID NO:8, or amino acids 110-118 of SEQ ID NO:8). In one or more embodiments, an antibody that binds to *M. hyopneumoniae* includes at least two CDRs of the $V_L$ domain of MAb 2C9.B3 or at least two CDRs of the $V_L$ domain of MAb 4G11.A3. In one or more embodiments, an antibody that binds to M. an antibody that binds to M. hyopneumoniae In one or more embodiments, may contain one, two, three, four, five, six, or more amino acid substitutions in one or more CDRs identified above that do not substantially affect binding of the antibody to *M. hyopneumoniae.*

In one or more embodiments, an antibody that binds to *M. hyopneumoniae* may contain one, two, three, four, five, six, or more amino acid substitutions in one or more framework regions (FRs). In one or more embodiments, the substitution or substitutions in the FRs do not substantially affect binding of the antibody to *M. hyopneumoniae.*

In one or more embodiments, an antibody that binds to *M. hyopneumoniae* includes an amino acid sequence having at least 70%, at least 80%, at least 85%, at least 90%, at least 95%, at least 96%, at least 97%, at least 98%, or at least 99% identity to an amino acid sequence of at least one CDR of a $V_H$ domain of MAb 2C9.B3 or MAb 4G11.A3.

In one or more embodiments, an antibody that binds to *M. hyopneumoniae* includes an amino acid sequence having at least 70%, at least 80%, at least 85%, at least 90%, at least 95%, at least 96%, at least 97%, at least 98%, or at least 99% identical to an amino acid sequence of at least one CDR of a $V_L$ domain of MAb 2C9.B3 or MAb 4G11.A3.

In another aspect, this disclosure describes an isolated nucleic acid sequence that encodes any embodiment of an antibody that binds to *M. hyopneumoniae* (or fragment thereof). In one or more embodiments, the isolated nucleic acid encodes an antibody that includes one or more of the CDRs of SEQ ID NO:2, SEQ ID NO:4, SEQ ID NO:6, or SEQ ID NO:8. Given the amino acid sequence of any antibody or antibody fragment, a person of ordinary skill in the art can determine the full scope of polynucleotides that encode that amino acid sequence using conventional, routine methods. In one or more embodiments, the isolated nucleotide can include the portion or portions of SEQ ID NO:1, SEQ ID NO:3, SEQ ID NO:5, or SEQ ID NO:7 that encode one or more CDRs of SEQ ID NO:2, SEQ ID NO:4, SEQ ID NO:6, or SEQ ID NO:8.

As used herein, the term "nucleic acid" or "oligonucleotide" refers to polynucleotides such as deoxyribonucleic acid (DNA) or ribonucleic acid (RNA). Nucleic acids include but are not limited to genomic DNA, cDNA, mRNA, iRNA, miRNA, tRNA, ncRNA, rRNA, and recombinantly produced and chemically synthesized molecules such as aptamers, plasmids, anti-sense DNA strands, shRNA, ribozymes, nucleic acids conjugates, and oligonucleotides. A nucleic acid may be single-stranded, double-stranded, linear, or covalently circularly closed molecule. A nucleic acid can be isolated. The term "isolated nucleic acid" means that the nucleic acid (i) was amplified in vitro, for example via polymerase chain reaction (PCR), (ii) was produced recombinantly by cloning, (iii) was purified, for example, by cleavage and separation by gel electrophoresis, (iv) was synthesized, for example, by chemical synthesis, or (vi) extracted from a sample. A nucleic might be introduced—i.e., transfected—into cells. When RNA is used to transfect cells, the RNA may be modified by stabilizing modifications, capping, or polyadenylation.

As used herein "amplified DNA" or "PCR product" refers to an amplified fragment of DNA of defined size. Various techniques are available and well known in the art to detect PCR products. PCR product detection methods include, but are not restricted to, gel electrophoresis using agarose or polyacrylamide gel and adding ethidium bromide staining (a DNA intercalant), labeled probes (radioactive or non-radioactive labels, southern blotting), labeled deoxyribonucleotides (for the direct incorporation of radioactive or non-radioactive labels) or silver staining for the direct visualization of the amplified PCR products; restriction endonuclease digestion, which relies on agarose gel electrophoresis, polyacrylamide gel electrophoresis, or high-performance liquid chromatography (HPLC); dot blots, using the hybridization of the amplified DNA on specific labeled probes (radioactive or non-radioactive labels); high-pressure liquid chromatography using ultraviolet detection; electro-chemiluminescence coupled with voltage-initiated chemical reaction/photon detection; and direct sequencing using radioactive or fluorescently labeled deoxyribonucleotides for the determination of the precise order of nucleotides with a DNA fragment of interest, oligo ligation assay (OLA), PCR, qPCR, DNA sequencing, fluorescence, gel electrophoresis, magnetic beads, allele specific primer extension (ASPE) and/or direct hybridization.

Generally, nucleic acid can be extracted, isolated, amplified, or analyzed by a variety of techniques well-established and known to those of skill in the art. Examples of nucleic acid analysis include, but are not limited to, sequencing and DNA-protein interaction. Sequencing may be by any method known in the art. DNA sequencing techniques include classic dideoxy sequencing reactions (Sanger method) using labeled terminators or primers and gel separation in slab or capillary, and next generation sequencing methods such as sequencing by synthesis using reversibly terminated labeled nucleotides, pyrosequencing, 454 sequencing, Illumina/Solexa sequencing, allele specific hybridization to a library of labeled oligonucleotide probes, sequencing by synthesis using allele specific hybridization to a library of labeled clones that is followed by ligation, real time monitoring of the incorporation of labeled nucleotides during a polymerization step, polony sequencing, and SOLiD sequencing. Separated molecules may be sequenced by sequential or single extension reactions using polymerases or ligases as well as by single or sequential differential hybridizations with libraries of probes.

In another aspect, this disclosure describes a host cell including any of the isolated nucleic acid sequences and/or proteins described herein. Thus, this disclosure encompasses translation of a nucleic acid (e.g., an mRNA) by a host cell to produce an antibody encoded by the nucleic acid.

The nucleic acid constructs described herein may be introduced into a host cell, thus allowing expression of the antibody within the cell, thereby generating a genetically engineered cell. A variety of methods are known in the art and suitable for introducing a nucleic acid into a cell, including viral and non-viral mediated techniques. Examples of typical non-viral mediated techniques include, but are not limited to, electroporation, calcium phosphate mediated transfer, nucleofection, sonoporation, heat shock, magnetofection, liposome mediated transfer, microinjection, microproj ectile mediated transfer (nanoparticles), cationic polymer mediated transfer (DEAE-dextran, polyethylenimine, polyethylene glycol (PEG) and the like) or cell fusion. Other methods of transfection include proprietary transfection reagents such as LIPOFECTAMINE (Thermo Fisher Scientific, Inc., Waltham, MA), HILYMAX (Dojindo Molecular Technologies, Inc., Rockville, MD), FUGENE (Promega Corp., Madison, WI), JETPEI (Polyplus Transfection, Illkirch, France), EFFECTENE (Qiagen, Hilden, Germany) and DreamFect (OZ Biosciences, Inc. USA, San Diego, CA).

The nucleic acid constructs described herein may be introduced into a host cell to be altered, thus allowing expression within the cell of the protein encoded by the nucleic acid. A variety of host cells are known in the art and suitable for protein expression. Examples of typical cell used for transfection and protein expression include, but are not limited to, a bacterial cell, a eukaryotic cell, a yeast cell, an insect cell, or a plant cell such as, for example, *E. coli, Bacillus, Streptomyces, Pichia pastoris, Salmonella typhimurium*, Drosophila SJ2, Spodoptera SJ9, CHO, COS (e.g., COS-7),3T3-F442A, HeLa, HUVEC, HUAEC, NIH 3T3, Jurkat, 293, 293H, or 293F.

The antibody may be an antibody from any suitable species. In one or more embodiments, the antibody may be a mouse antibody. In one or more embodiments, the antibody may be a rat antibody. In one or more embodiments, the antibody may be a rabbit antibody.

In one or more embodiments, the antibody is an IgG antibody. In one or more embodiments, the antibody may be an antibody or an IgG subclass including, for example, IgG1, IgG2, IgG3 or IgG4. In one or more embodiments, the antibody may be a mouse IgG of one of the following sub-classes: IgG1, IgG2A, IgG2B, IgG2C, and IgG3. In one or more embodiments, the antibody may be a mouse IgG1.

In one or more embodiments, the antibody may include a kappa light chain. In one or more embodiments, the antibody may include a lambda light chain.

In one or more embodiments, the monoclonal antibody includes an antigen-binding fragment such as, for example, a Fab fragment, a Fab' fragment, an F(ab)$_2$ fragment, and/or an Fv fragment.

In one or more embodiments, the antibody may be a humanized antibody. An antibody that binds to *M. hyopneumoniae* may be humanized by any suitable method. Techniques for producing humanized monoclonal antibodies may be found, for example, in Jones et al. (1986) *Nature* 321:522 and Singer et al. (1993) *J. Immunol.* 150:2844. For example, humanization of the antibody may include changes to the antibody to reduce the immunogenicity of the antibody when used in humans. In one or more embodiments, a humanized antibody that binds to *M. hyopneumoniae* may include at least a portion of an immunoglobulin constant region (Fc) of a human immunoglobulin. A humanized antibody that binds to *M. hyopneumoniae* may include, in one or more embodiments, a human immunoglobulin (recipient antibody) in which residues from one or more complementary determining regions (CDRs) of the recipient antibody are replaced by residues from one or more CDRs of a non-human species antibody (donor antibody), such as mouse, rat, or rabbit antibody, that binds to *M. hyopneumoniae*. In one or more embodiments, Fv framework residues of a human immunoglobulin may be replaced by corresponding non-human residues from an antibody that binds to *M. hyopneumoniae*.

In one or more embodiments, a monoclonal antibody includes a chimeric antibody—i.e., an antibody in which different portions are derived from different animal species. A chimeric antibody may be obtained by any known method such as, for example, splicing the genes from a mouse antibody molecule with appropriate antigen specificity together with genes from a human antibody molecule of appropriate biological specificity. Methods for preparing chimeric antibodies are established and well-known to those of ordinary skill in the art.

Hybridoma Cell Lines

This disclosure further describes hybridoma cell lines (also referred to herein as "clones" or "antibody clones") 2C9 and 4G11, and their subclones 2C9.B3 and 4G11.A3 (also referred to by the internal laboratory designations M. hyo 2C9.B3 and M. hyo 4G11.A3). 2C9.B3 and 4G11.A3 express monoclonal antibodies MAb 2C9.B3 and MAb 4G11.A3, respectively. In one or more embodiments, a monoclonal antibody produced by a hybridoma cell line binds to *M. hyopneumoniae*.

Hybridoma cell lines may be obtained by various techniques familiar to those skilled in the art. In one or more embodiments, the animal immunized to produce a hybridoma cell line is preferably a mammal. In one or more embodiments, the immunized animal is a rat including (e.g., a Wistar rat) or a mouse (e.g., a BALB/C mouse). In one or more embodiments, the cells obtained from the immunized animal to produce a hybridoma are spleen cells. In one or more embodiments, the cells obtained from the immunized animal to produce a hybridoma are preferably lymphocytes. In one or more embodiments, the hybridoma is produced using a myeloma cell such as, for example, an SP2/O cell.

Other known methods of producing transformed B cell lines that produce monoclonal antibodies may also be used.

Methods of Making the Antibodies

In another aspect, this disclosure describes methods of making antibodies that detect *M. hyopneumoniae*.

A monoclonal antibody may be obtained by any suitable technique.

In one or more embodiments, a monoclonal antibody that binds to *M. hyopneumoniae* may be produced by a hybridoma cell described herein.

In one or more embodiments, an antibody that binds to *M. hyopneumoniae* may be made by recombinant DNA methods, produced by phage display, and/or produced by combinatorial methods. DNA encoding an antibody that binds to *M. hyopneumoniae* may be readily isolated and sequenced using conventional procedures. In one or more embodiments, a hybridoma cell described herein may serve as a source of such DNA. Once isolated, the DNA may be transfected into a host cell (including, for example, simian COS cells, Chinese hamster ovary (CHO) cells, human embryonic kidney cells (HEK), or myeloma cells that do not otherwise produce immunoglobulin protein) or introduced into a host cell by genome editing (for example, using a CRISPR-Cas system) to obtain the synthesis of antibodies in a recombinant host cell. The DNA encoding an antibody that binds to *M. hyopneumoniae* may be modified to, for example, humanize the antibody.

Methods of Using the Antibodies

In yet another aspect, this disclosure describes methods of using antibodies that bind to *M. hyopneumoniae*. An antibody that binds to *M. hyopneumoniae*, as described herein, may be used for any suitable application. For example, a monoclonal antibody may be used in both in vitro and in vivo diagnostic and therapeutic methods. In one or more embodiments, the diagnostic methods may preferably be in vitro diagnostic methods including, for example, detecting *M. hyopneumoniae* in a sample from a subject.

In one or more embodiments, an antibody may be used to label and/or detect *M. hyopneumoniae*, in vivo or in vitro.

In one or more embodiments, an antibody may be used to detect the presence or absence of *M. hyopneumoniae* in a sample from a subject. In one or more embodiments, detecting the presence of *M. hyopneumoniae* may include identifying an amount of *M. hyopneumoniae* in a sample from a subject.

As used herein, the term "subject" includes, but is not limited to, humans and non-human vertebrates. Non-human vertebrates include livestock animals, companion animals, and laboratory animals. Non-human subjects also include non-human primates as well as rodents, such as, but not limited to, a rat or a mouse. Non-human subjects also include, without limitation, chickens, horses, cows, pigs, goats, dogs, cats, guinea pigs, hamsters, mink, and rabbits. In an exemplary embodiment, the subject is a pig.

Any suitable sample obtained from the subject may be used. Exemplary samples include a blood sample, a tissue sample, a laryngeal swab, a nasal swab, a bronchial swab, a sample obtained by deep tracheal catheter, etc. In one or more embodiments, a sample may include a tracheal fluid and/or another respiratory tract fluid. In one or more embodiments, a sample may preferably include a tracheal fluid. When the sample includes a tissue sample, the antibody that binds to *M. hyopneumoniae* may be used to detect *M. hyopneumoniae* in situ.

In one or more embodiments, detecting the presence of *M. hyopneumoniae* may include performing an assay on a sample from a subject. Exemplary assays include a magnetic bioassay, an enzyme-linked immunosorbent assay (ELISA), Western blot, immunohistochemistry, immunocytochemistry, flow cytometry, immunoprecipitation, etc. ELISA may include direct ELISA, indirect ELISA, and sandwich ELISA.

In one or more embodiments, detecting the presence of *M. hyopneumoniae* in a sample from a subject may be used to diagnose a subject with a *M. hyopneumoniae* infection.

This disclosure further described a kit or a device including an antibody. For example, the kit or device may include a composition that includes an anti-*M. hyopneumoniae* monoclonal antibody. The antibodies in the kit or device may be labeled with one or more detectable markers, as described herein. In one or more embodiments, the device may include a giant magnetoresistance (GMR)-based diagnostic immunoassay platform. In one or more embodiments, the device may preferably be portable (that is, easily conducted outside of a laboratory), allowing for, for example, pen-side testing for *M. hyopneumoniae*.

In an exemplary embodiment, an antibody that binds *M. hyopneumoniae* may be used in a diagnostic immunoassay. Such an immunoassay may be used in pen-side testing for detection of *M. hyopneumoniae*. Such an immunoassay may preferably be portable.

As further described in Example 4, the immunoassay may include a magnetic bioassay and, more specifically, a giant magnetoresistance (GMR)-based diagnostic immunoassay platform. Such a platform is described for the detection of Influenza A in Wu et al., *ACS Sens*. 2017, 2(11):1594-1601; and Su et al., *Front. Microbiol.* 2019; 10:1077. In one or more embodiments, the platform is preferably portable.

Such a platform may allow for real-time data collection. The data collected may include real-time changes in the magnetoresistance ratio (AMR) from each GMR sensor due to binding of a magnetic tag to the sensor through capture antibody-antigen-detection antibody complex. The data may be transmitted to any suitable device including, for example, a smartphone, a tablet, or a computer (laptop or desktop). For example, data transmission may be done wirelessly thorough Bluetooth to a smartphone, a tablet, and a laptop computer or through a USB connection to a laptop or a desktop computer.

Exemplary components of hand-held detection platform include a GMR sensors that includes two ferromagnetic layers separated by one or more metallic layers. Exemplary GMR sensors are described in Wu et al., *ACS Sens*. 2017, 2(11):1594-1601; and Su et al., *Front. Microbiol.* 2019; 10:1077. The surface of the GMR sensor may be functionalized so that the target antigen (e.g., *M. hyopneumoniae* or a specific protein of *M. hyopneumoniae*) specifically binds to the sensor. When a magnetic tag including, for example, a magnetic nanoparticle (MNP) binds to the target antigens (including, for example, via an antibody, as shown in FIG. 7(D)), the stray field generated by the MNPs results in the resistance change of the GMR sensors. This change may be measured, and, further, the change is proportional to the number of captured target antigens.

Any suitable magnetic tag may be used. Exemplary magnetic tags include magnetic nanoparticles (MNP) including superparamagnetic nanoparticles or microbeads. An exemplary superparamagnetic microbead is further described in Su et al., *Front. Microbiol.* 2019; 10:1077.

As used in the preceding description, the words "preferred" and "preferably" refer to embodiments that may afford certain benefits under certain circumstances. However, other embodiments may also be preferred under the same or different circumstances. Furthermore, an indication that one or more embodiments is preferred does not imply that other embodiments are not useful and is not intended to exclude other embodiments from the scope of the invention.

In the preceding description and following claims, the term "and/or" means one or all of the listed elements or a combination of any two or more of the listed elements; unless otherwise specified, "a," "an," "the," and "at least one" are used interchangeably and mean one or more than one; and the recitations of numerical ranges by endpoints include all numbers subsumed within that range (e.g., 1 to 5 includes 1, 1.5, 2, 2.75, 3, 3.80, 4, 5, etc.).

As used herein, the terms "comprises," "comprising," and variations thereof are to be construed as open ended—i.e., additional elements or steps are optional and may or may not be present. In contrast, use of term "consisting of" is meant to be limiting: "consisting of" indicates that the listed elements are required or mandatory, and that no other elements may be present. As used herein, the term "consisting essentially of" is meant to include any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

In the preceding description, particular embodiments may be described in isolation for clarity. Reference throughout this specification to "one embodiment," "an embodiment," "certain embodiments," "one or more embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments. Thus, features described in the context of one embodiment may be combined with features described in the context of a different embodiment except where the features are necessarily mutually exclusive.

EXAMPLES

The present invention is illustrated by the following examples. It is to be understood that the particular examples, materials, amounts, and procedures are to be interpreted broadly in accordance with the scope and spirit of the invention as set forth herein.

All reagents, starting materials, and solvents used in the following examples were purchased from commercial suppliers and were used without further purification unless otherwise indicated.

Example 1

Monoclonal antibodies were generated by standard hybridoma technique. (See FIG. 1.) Eight-week old female BALB/c mice were immunized subcutaneously with a preparation of membrane proteins of M. hyopneumoniae strain 232. The membrane proteins of M. hyopneumoniae were prepared by treating cells with 1% Tween 20 for 30 minutes at 37° C. and collecting the soluble fraction. Tween 20 was removed from the preparation before immunization using detergent removal resin. Mice were immunized three times, three weeks apart. Splenocytes from immunized mice were fused with SP2/0 myeloma cells by standard techniques using 50% polyethylene glycol 4000.

Hybridoma cultures were screened for secretion of antibodies to M. hyopneumoniae using direct ELISA on wells coated with total cell lysate.

Antibody cross reactivity to M. hyorhinis and M. flocculare was determined by ELISA and Western blotting methods.

A sandwich ELISA was developed to detect M. hyopneumoniae antigens by using polyclonal rabbit anti-M. hyopneumoniae as a capture antibody and monoclonal antibody (produced by a subclone) as the detection antibody. The polyclonal rabbit anti-M. hyopneumoniae was prepared by immunizing rabbits with same membrane protein preparation of M. hyopneumoniae used for monoclonal antibody.

Figure 2:
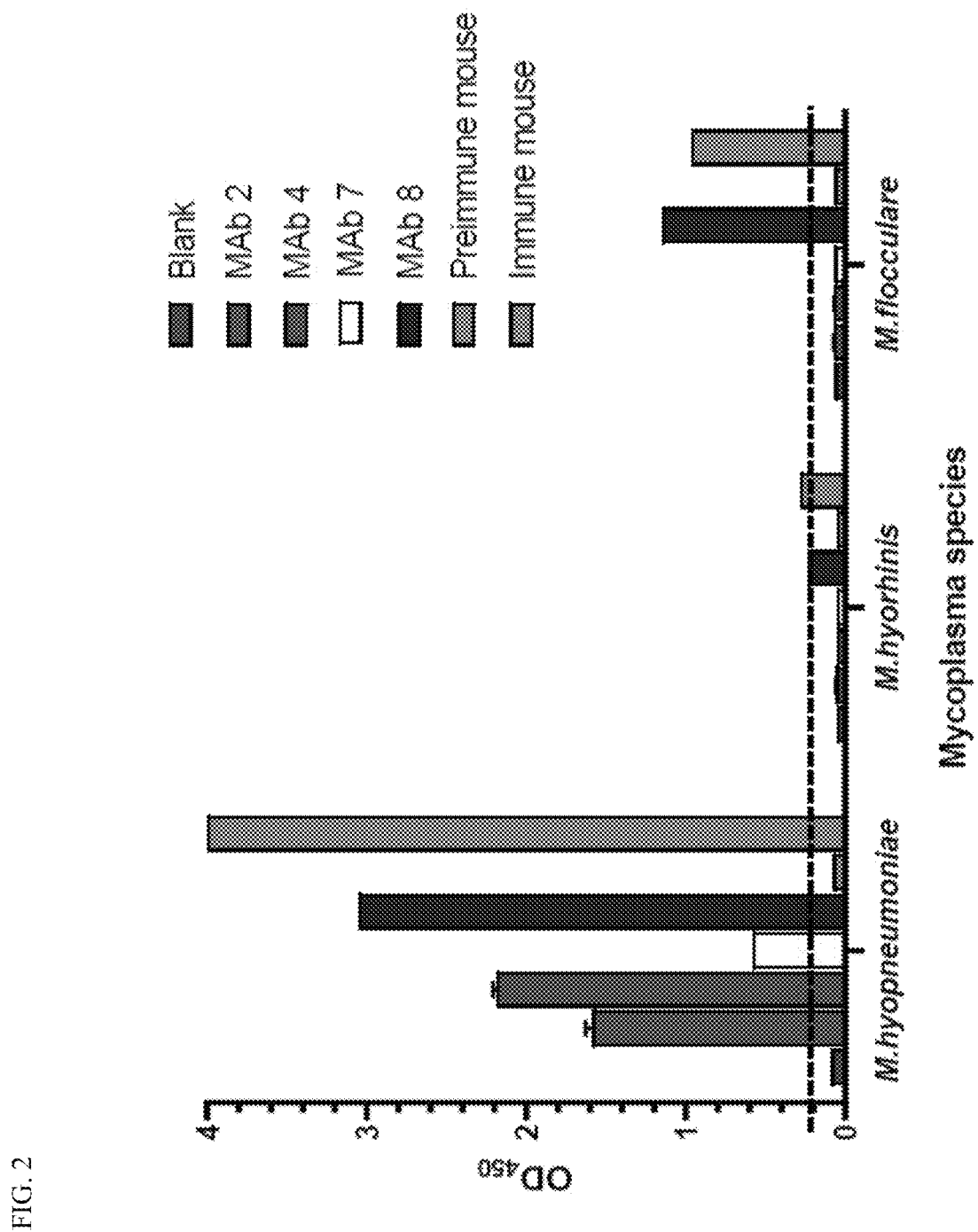
FIG. 2. Characterization of monoclonal antibodies to *M. hyopneumoniae*. Data shows reactivity of selected monoclonal antibodies to *M. hyopneumoniae*, *M. hyorhinis*, and *M. flocculare* by ELISA. Microtiter wells were coated with whole cell lysate of indicated *Mycoplasma* species and detected using culture supernatant from different hybridoma clones (prior to subcloning) followed by goat anti-mouse IgG-HRP and TMB/$H_2O_2$ substrate. Pre-immune mouse sera was included as a control. Blank did not include any antibody, only a sample diluent (phosphate buffer saline (PBS) with 1% bovine serum albumin (BSA)) used to dilute the samples. Dotted line indicates the cut-off value.
Figure 3:
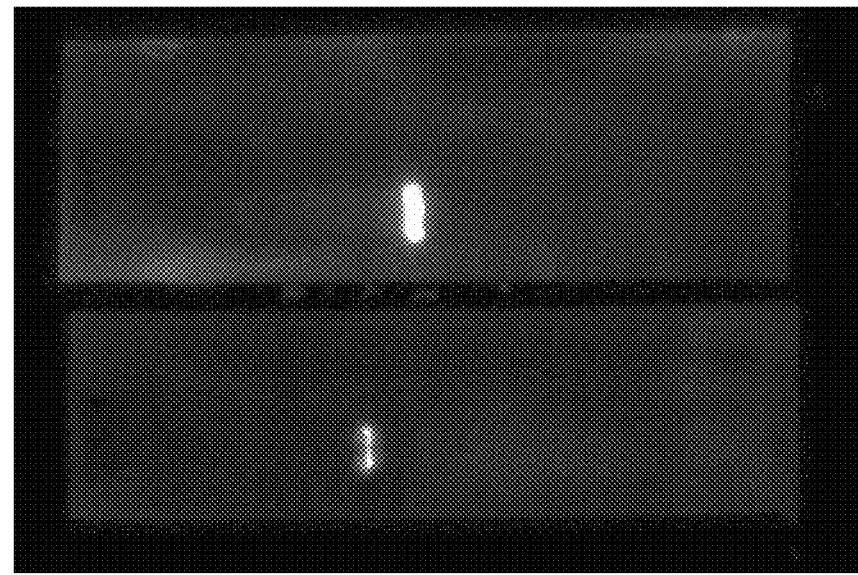
FIG. 3. Characterization of monoclonal antibodies to *M. hyopneumoniae*. Specific reactivity of two monoclonal antibodies, MAb 2C9.B3 and MAb 4G11.A3, to *M. hyopneumoniae* but not to *M. hyorhinis* and *M. flocculare* as determined by Western blot. Whole cell lysate of (1) *M. hyopneumoniae* (2) *M. hyorhinis* and (3) *M. flocculare* were run on 12.5% SDS-PAGE, transferred to PVDF membrane and reacted with MAb 2C9.B3 or MAb 4G11.A3, followed by goat anti-mouse IgG-HRP conjugate. (A) Results obtained with a DAB/$H_2O_2$ substrate. (B) Results obtained with a chemiluminescent substrate. M: Protein size marker. MAb 2C9.B3 binds to an ~72 kDa protein and MAb 4G11.A3 binds to an ~45 kDa protein of *M. hyopneumoniae*.
Figure 3:
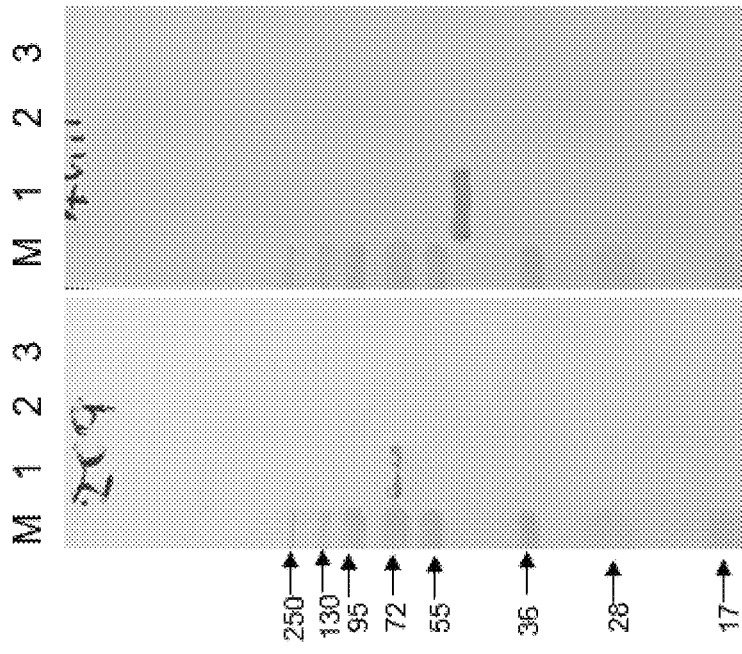

Initial screening of hybridoma cells revealed 23 clones secreting antibodies to M. hyopneumoniae with absorbance in ELISA ranging from 0.5 to 4.00. Of these, four clones were selected for cross reactivity study and three clones that were specific to M. hyopneumoniae and which showed no cross reactivity to M. hyorhinis and M. flocculare antigens were identified. (See FIG. 2 and FIG. 3)

Two of the hybridoma clones (2C9 and 4G11) produced antibodies which exhibited an absorbance of greater than 1.00 by ELISA and which demonstrated reactivity to different proteins of M. hyopneumoniae by Western blot were sub-cloned by limiting dilution and used for further characterization, resulting in 2C9.B3 (which produces antibodies referred to herein as MAb 2C9.B3 or MAb 2) and 4G11.A3 (which produces antibodies also referred to herein as MAb 4G11.A3 or MAb 4).

Cross-reactivity analysis by both Western blot and ELISA confirmed both MAb 2C9.B3 and MAb 4G11.A3 are specific to M. hyopneumoniae. Isotyping showed both MAb 2C9.B3 and MAb 4G11.A3 are IgG1 isotype.

Figure 4:
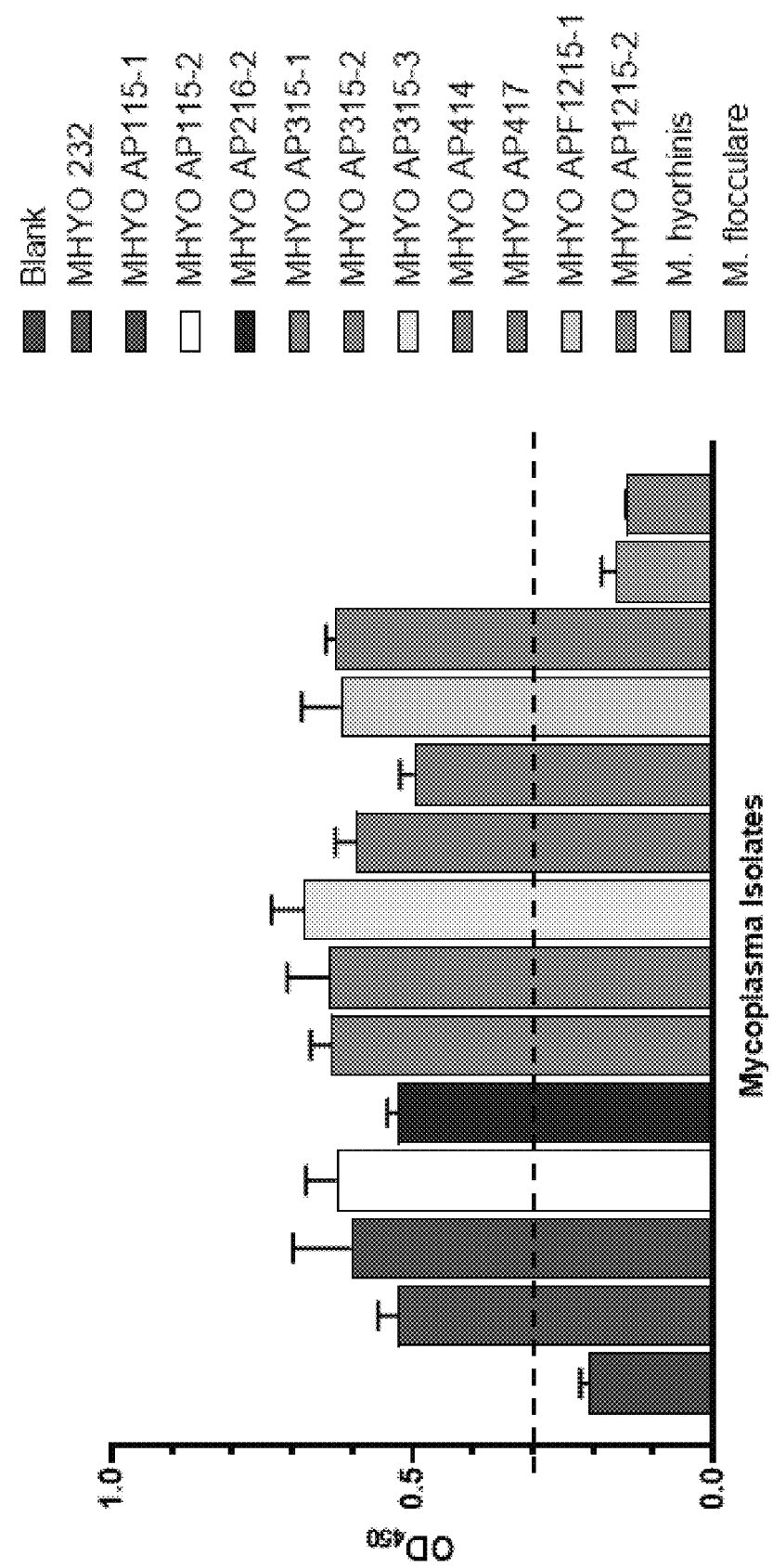
FIG. 4. Results of an exemplary sandwich ELISA using rabbit anti-*M. hyopneumoniae* as capture antibody and MAb 2C9.B3 (also referred to herein as MAb 2) to *M. hyopneumoniae* as detection antibody for detection of multiple isolates of *M. hyopneumoniae* from different swine farms. Dotted line indicates the cut-off value.
Figure 5:
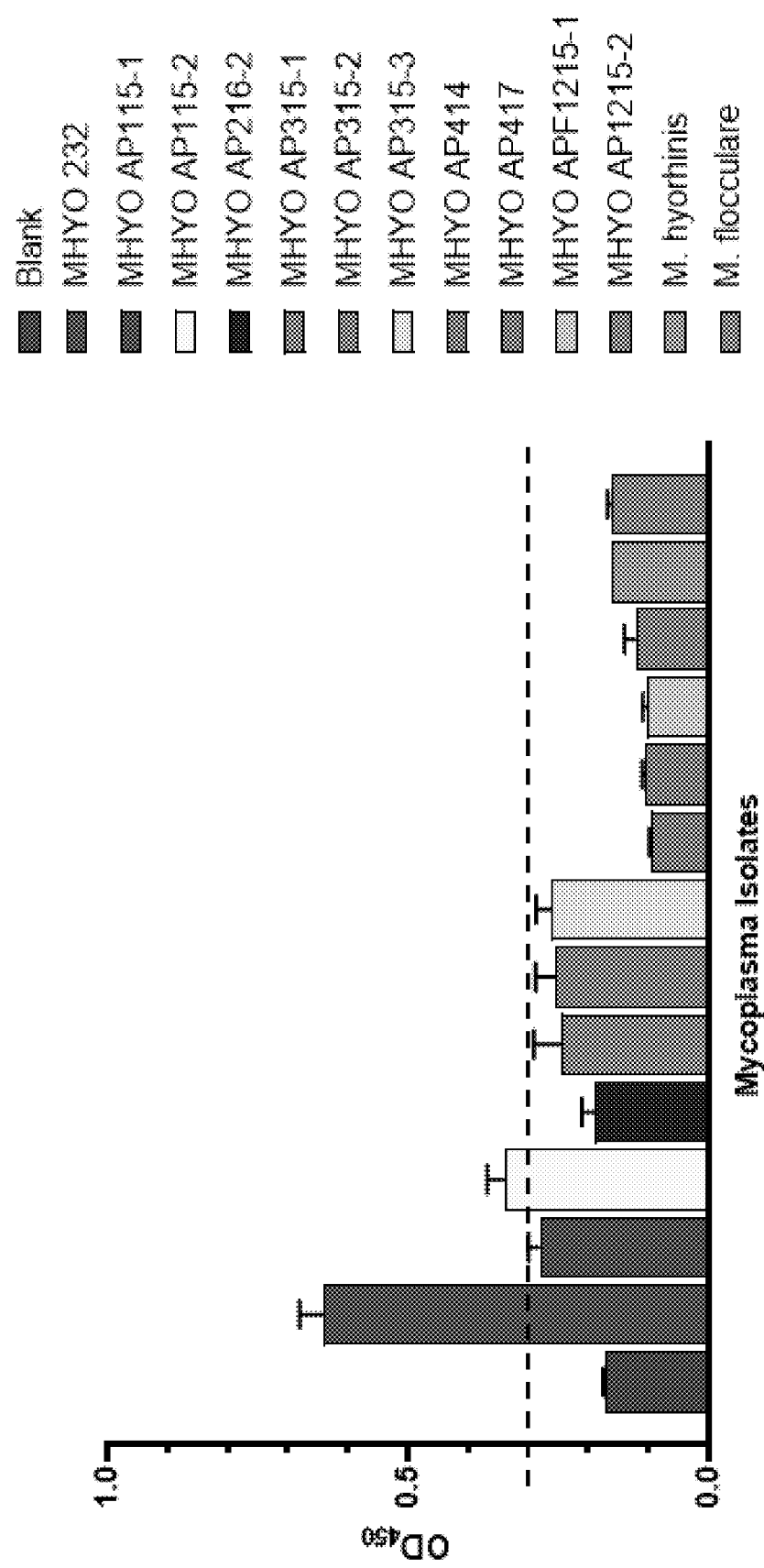
FIG. 5. Results of an exemplary sandwich ELISA using rabbit anti-*M. hyopneumoniae* as capture antibody and MAb 4G11.A3 (also referred to herein as MAb 4) to *M. hyopneumoniae* as detection antibody for detection of multiple isolates of *M. hyopneumoniae* from different swine farms. Dotted line indicates the cut-off value.

The monoclonal antibodies produced by 2C9.B3 and 4G11.A3 (MAb 2C9.B3 and MAb 4G11.A3) were used as the detection antibody in a sandwich ELISA to detect different field isolates of M. hyopneumoniae. Results are shown in FIG. 4 and FIG. 5. Antibodies from one of the clones (MAb 2C9.B3) detected all ten M. hyopneumoniae isolates tested that were obtained from different swine farms.

Example 2

This Example describes the development of an ELISA assay that may accurately detect the presence of M. hyopneumoniae at concentrations as low as 1 µg/mL.

A sandwich ELISA assay (as described in Example 1) was used to test for lab-grown M. hyopneumoniae diluted in buffer or M. hyopneumoniae isolated from swine lung tissue. Varying concentrations (2 µg/mL, 3 µg/mL, 5 µg/mL, or 10 µg/mL) of the capture antibody were used. Varying amounts (1% and 3%) bovine serum albumin (BSA) in blocking buffer (PBS and 1% normal goat serum) was tested. Inclusion of detergents (NP40 and Tween 20) was also tested.

Anti-mouse IgG (R&D Systems, Minneapolis, MN) was used as the enzyme-linked secondary antibody.

Undiluted culture supernatant from hybridoma cultures was used as the detection antibody.

Figure 6:
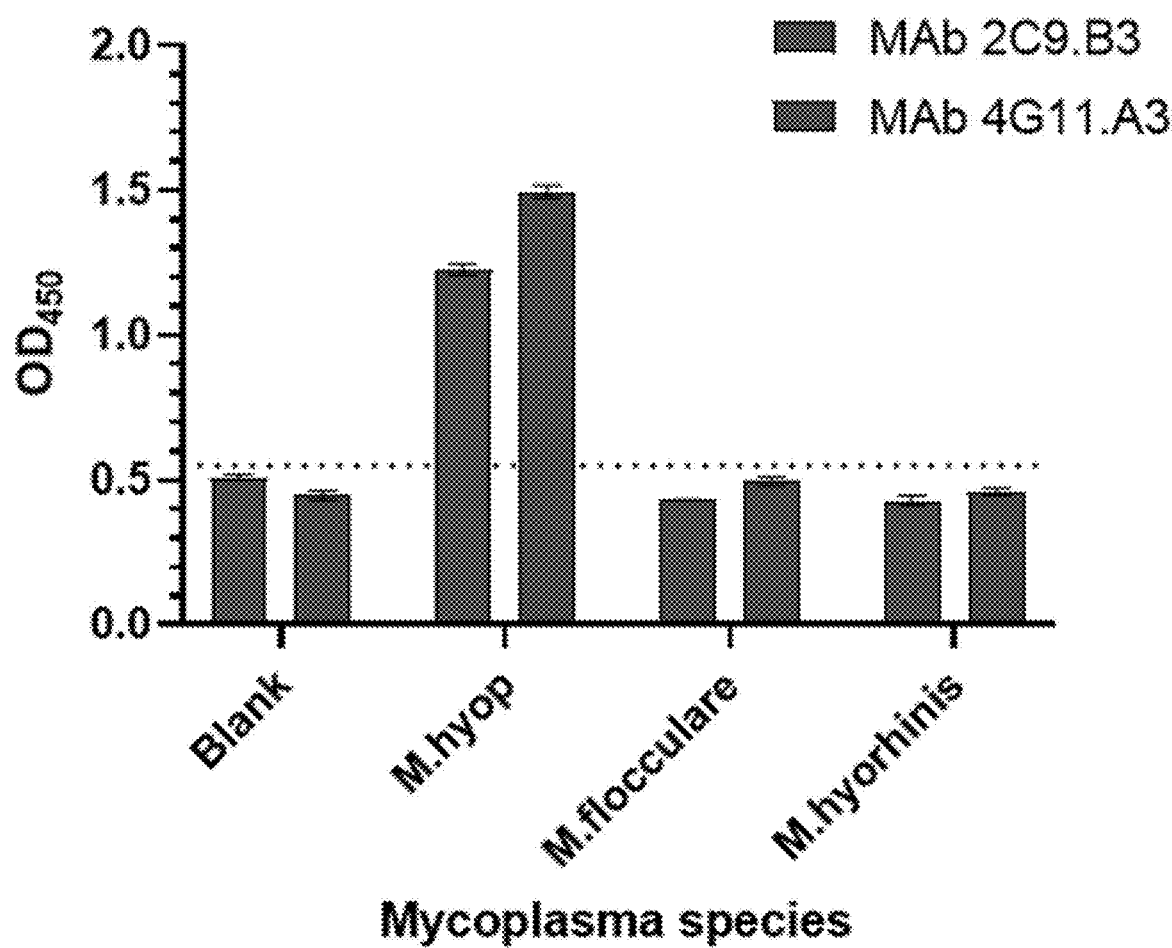
FIG. 6. Exemplary results of *M. hyopneumoniae* detection as described in Example 2. MAb2C9.B3 versus MAb4G11.A3 with background *Mycoplasma*. Results of an exemplary sandwich ELISA assay, as further described in Example 2. FIG.

Detection was performed using 3,3',5,5'-Tetramethylbenzidine (TMB) substrate (Thermo Fisher Scientific, Waltham, MA). 2M HCl was used as a stop solution Results were measured using endpoint absorption at 450 nm with a delay of 100 milliseconds. The sensitivity and specificity of MAb 2 and MAb 4 were examined. Exemplary results are shown in FIG. 6A.

A capture antibody concentration of 3 µg/mL was found to be optimal among those tested (2 µg/mL, 3 µg/mL, 5 µg/mL, and 10 µg/mL).

3% BSA in blocking buffer was found to provide less background signal relative to 1% BSA in blocking buffer.

Use of a detergent was found to be preferred, and NP40 allowed for more sensitive detection than Tween 20.

M. hyopneumoniae was detectable at concentrations in a range of 1 µg/mL to 200 µg/mL.

Example 3

Total RNA was isolated from the hybridoma cells following the manufacturer's instructions. Total RNA was then reverse-transcribed into cDNA using either isotype-specific anti-sense primers or universal primers following the technical manual of SMARTScribe Reverse Transcriptase (Takara Bio Inc., San Jose, CA). Antibody fragments of heavy chain and light chain were amplified according to the standard operating procedure (SOP) of rapid amplification of cDNA ends (RACE) (GenScript Biotech Corp., Piscataway, NJ). Amplified antibody fragments were cloned into a standard cloning vector separately. Colony PCR was performed to screen for clones with inserts of correct sizes. The consensus sequence was provided.

Example 4

Figure 7:
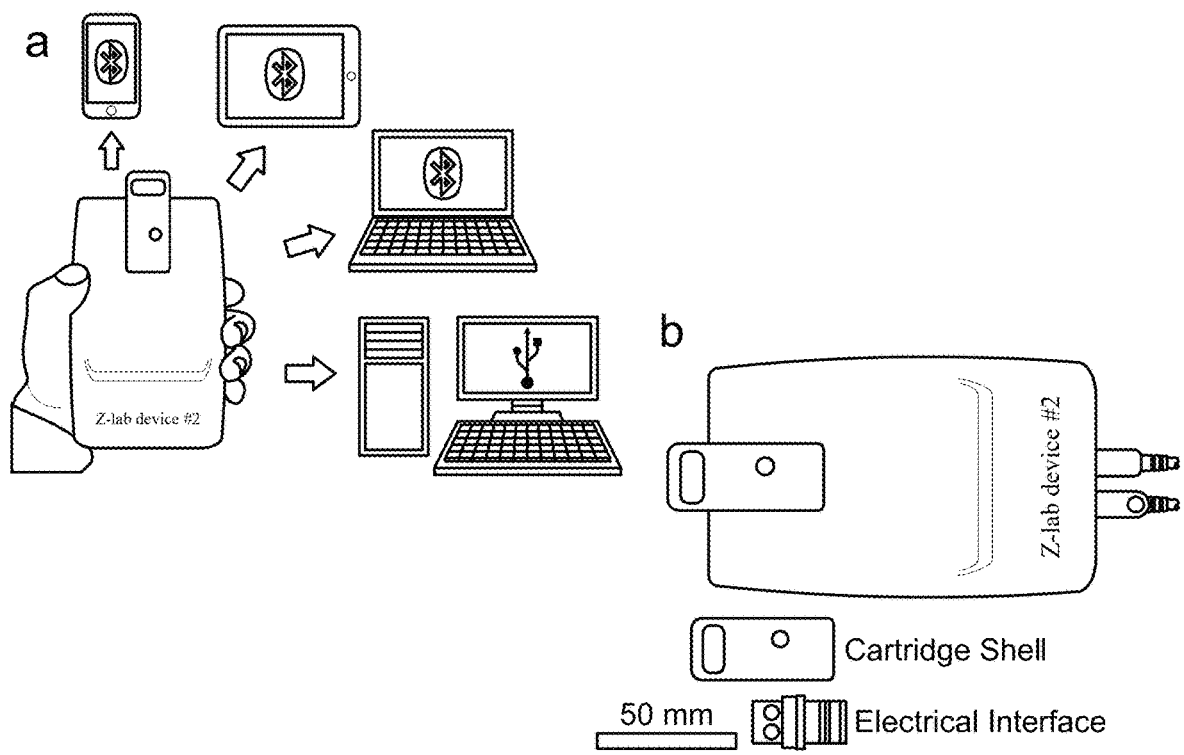
Figure 7:
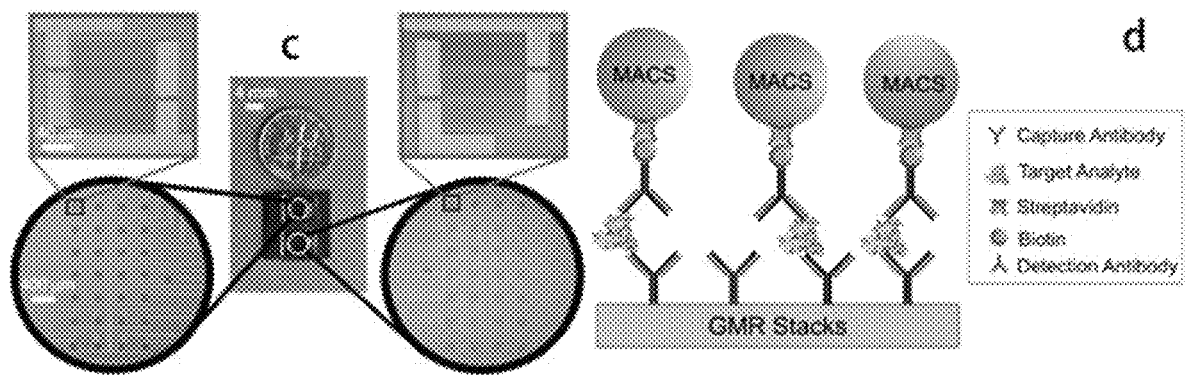
Figure 7:
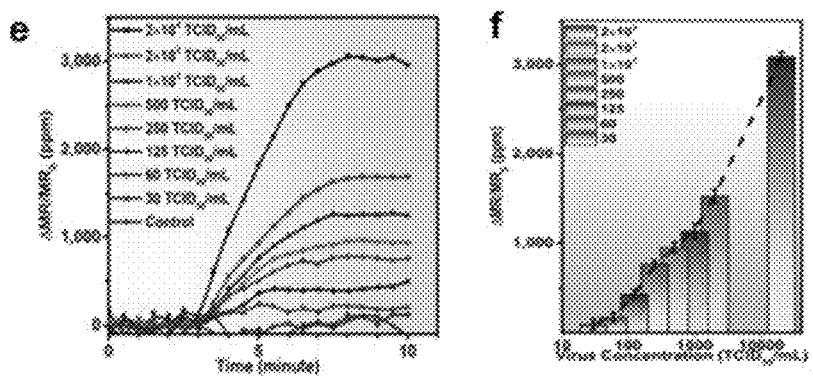
Figure 8:
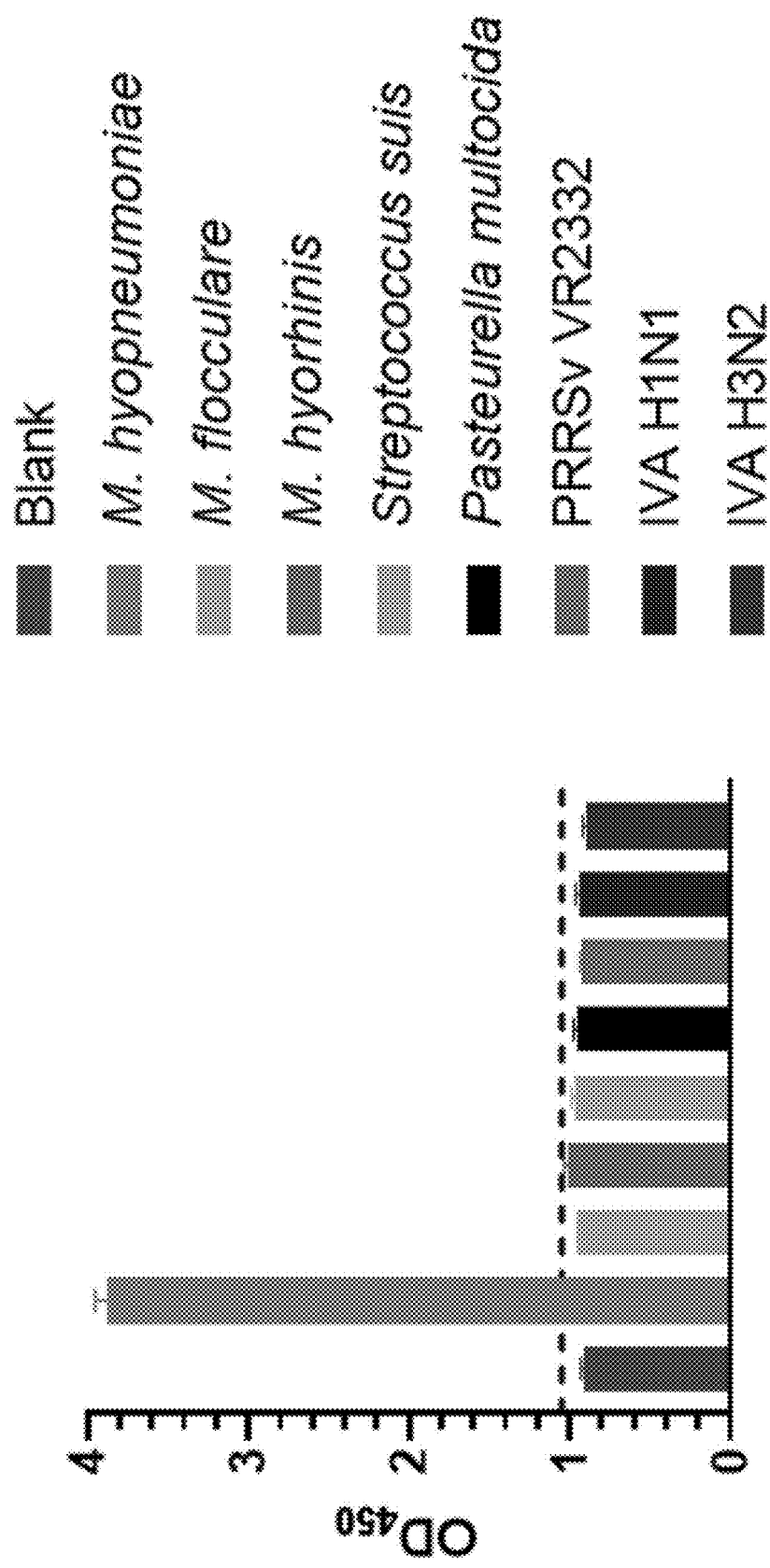
Figure 9:
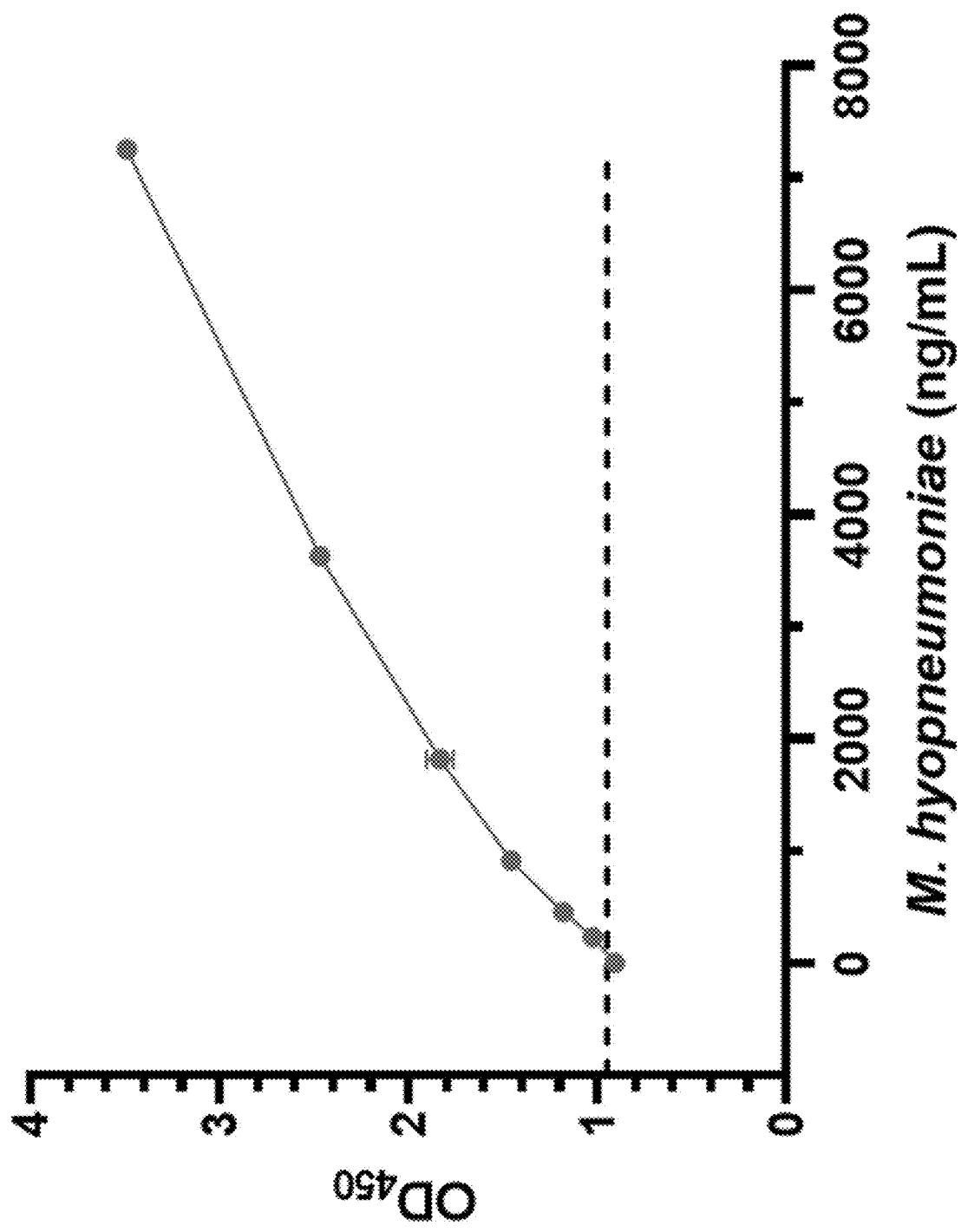
Figure 10:
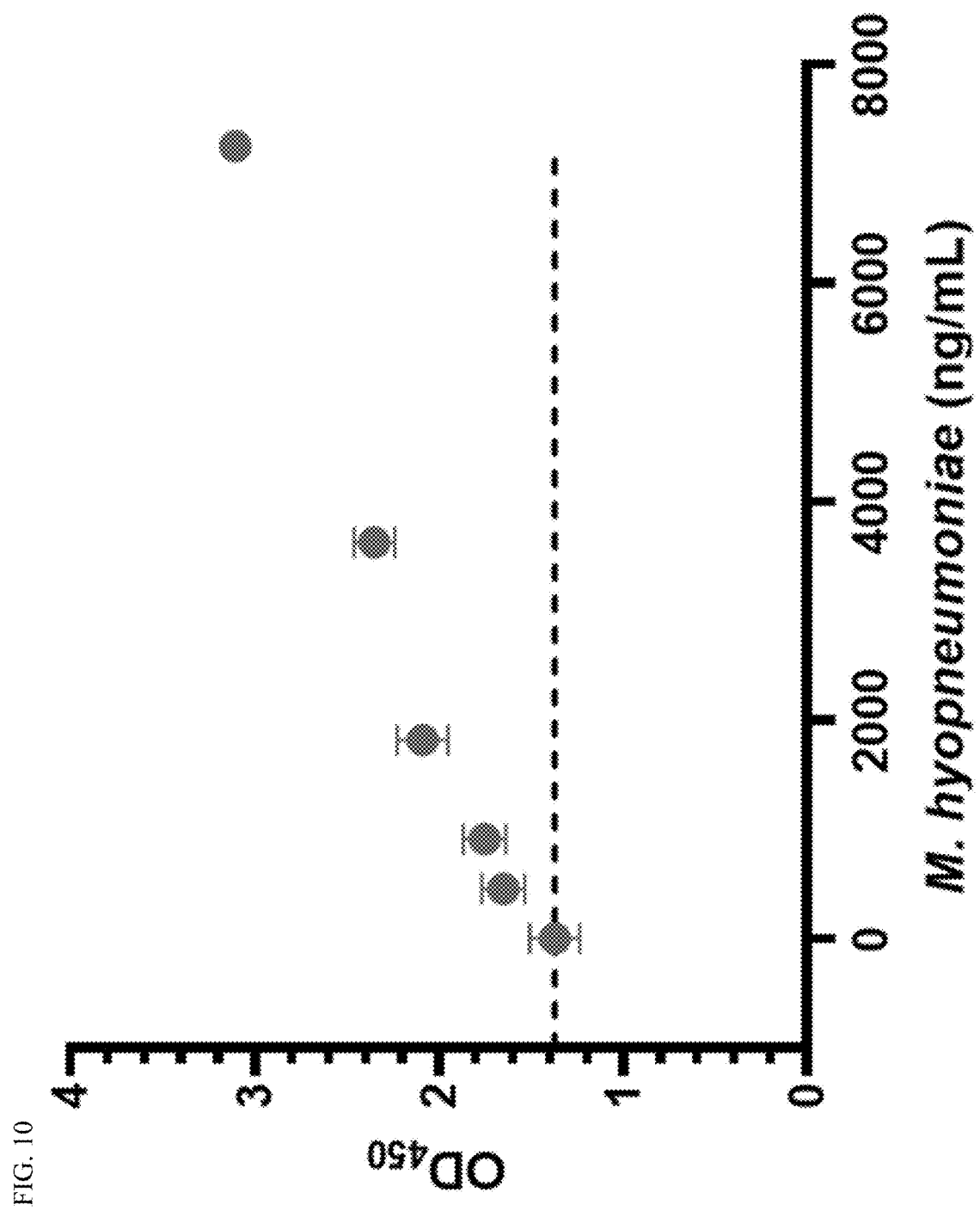
Figure 11:
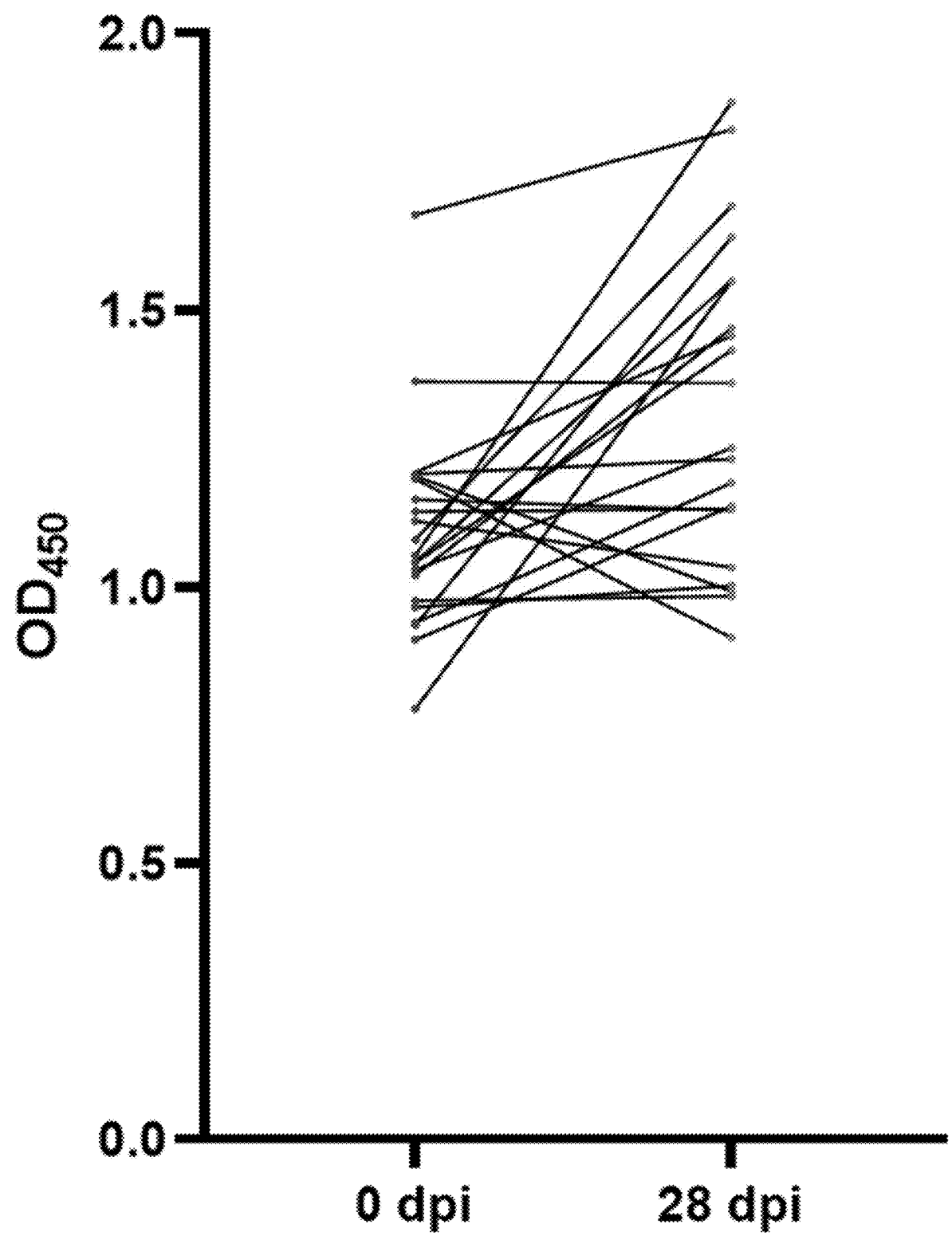

This Example describes the planned development of a giant magnetoresistance (GMR)-based portable diagnostic immunoassay platform for pen-side detection of M. hyopneumoniae directly from swine respiratory samples. An exemplary system that may be used is shown in FIG. 7. This portable testing platform would allow the antibodies described herein to be used for pen-side testing, providing the swine industry with a more effective tool for M. hyopneumoniae screening and monitoring.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Sequence Listing Free Text
MAb 2C9.B3 heavy chain DNA sequence
SEQ ID NO: 1
ATGGCTGTCT TGGGGCTGCT CTTCTGCCTG

GTGACATTCC CAAGCTGTGT CCTATCCCAG

GTGCAGCTGA AGCAGTCAGG ACCTGGCCTA

GTGCAGCCCT CACAGAGCCT GTCCATCACC

TGCACAGTCT CTGGTTTCTC ATTAACTACC

TATGCTATAC ACTGGGTTCG CCAGTCTCCA

GGAAAGGGTC TAGAGTGGCT GGGAGTGATA

TGGAGTGGTG GAAACACAGA CTATAATGCA

GCTTTCATAT CCAGACTGAG CATCACTAAG

GACAATTCCA AGAGCCAAGT TTTCTTTAAA

ATGAACAGTC TGCAACCTAA TGACACAGCC

ATATATTATT GTGCCAGAGA GGCCTCTACT

ATGATAACGA CGGACTACTG GGGCCAAGGC

ACCACTCTCA CAGTCTCCTC A
Signal sequence: 1-57
FR1: 58-147
CDR1: 148-162
FR2: 163-204
CDR2: 205-252
FR3: 253-348
CDR3: 349-378
FR4: 379-411

MAb 2C9.B3 heavy chain amino acid sequence
SEQ ID NO: 2
MAVLGLLFCL VTFPSCVLSQ VQLKQSGPGL

VQPSQSLSIT CTVSGFSLTT YAIHWVRQSP

GKGLEWLGVI WSGGNTDYNA AFISRLSITK

DNSKSQVFFK MNSLQPNDTA IYYCAREAST

MITTDYWGQG TTLTVSS

Signal peptide: 1-19
FR1: 20-49
CDR1: 50-54
FR2: 55-68
CDR2: 69-84
FR3: 85-116
CDR3: 117-126
FR4: 127-137

MAb 2C9.B3 light chain DNA sequence
SEQ ID NO: 3
ATGGAGTCAC AGATTCAGGC ATTTGTATTC

GTGTTTCTCT GGTTGTCTGG TGTTGACGGA

GACATTGTGA TGACCCAGTC TCACAAATTC

ATGTCCACAT CAGTAGGAGA TAGGGTCACC

ATCACCTGCA GGGCCAGTCA GGATGTGAGT

ACTGCTGTAG CCTGGTATCA ACAAAAACCA

GGCCAATCTC CTAAACTACT GATTTACTGG

GCATCCATCC GGCACACTGG AGTCCCTGAT

CGCTTCACAG GCAGTGGATC TGGGACAGAT

TATACTCTCA CCATCAGCAG TGTGCAGGCT

GAAGACCTGG CACTTTATTA CTGTCAGCAA

CATTATTTCA CTCCGCTCAC GTTCGGTGCT

GGGACCAAGC TGGAGCTGAA A
Signal sequence: 1-60
FR1: 61-129
CDR1: 130-162
FR2: 163-207
CDR2: 208-228
FR3: 229-324
CDR3: 325-351
FR4: 352-381

MAb 2C9.B3 light chain amino acid sequence
SEQ ID NO: 4
MESQIQAFVF VFLWLSGVDG DIVMTQSHKF

MSTSVGDRVT ITCRASQDVS TAVAWYQQKP

GQSPKLLIYW ASIRHTGVPD RFTGSGSGTD

YTLTISSVQA EDLALYYCQQ HYFTPLTFGA

GTKLELK
Signal peptide: 1-20
FR1: 21-43
CDR1: 44-54
FR2: 55-69
CDR2: 70-76
FR3: 77-108
CDR3: 109-117
FR4: 118-127

MAb 4G11.A3 heavy chain DNA sequence
SEQ ID NO: 5
ATGGAATGGC CTTGGATCTT TCTCTTCCTC

CTGTCAGTAA CTGAAGGTGT CCACTCCCAG

GTTCAGCTGC AGCAGTCTGG GGCTGAGCTG

GTGAGGCCTG GGTCCTCAGT GAAGATTTCC

TGCAGGGCTT CTGGCTATTT ATTCAGTACC

TTCTGGATAA ACTGGGTGAA GCAGAGGCCT

GGACAGGGTC TTGAGTGGAT TGGACAGATT

TATCCTGGAG ATGGTGATAC TAACTACAAT

GGAAAGTTCA GGGGTAAAGC CACACTGACT

GCAGACAAAT CCTCCAGCAC AGCCTACATG

CAGCTCAGCA GCCTAACATC TGAGGACTCT

GCGGTCTATT TCTGTGCAAG AAGGGAAGTT

TTGATCTATG ATGATTACTA CGATGCTCTG

GACTACTGGG GTCAAGGAAC CTCAGTCACC

GTCTCCTCA
Signal sequence: 1-57
FR1: 58-147
CDR1: 148-162
FR2: 163-204
CDR2: 205-255
FR3: 256-351
CDR3: 352-396
FR4: 397-429

MAb 4G11.A3 heavy chain amino acid sequence
SEQ ID NO: 6
MEWPWIFLFL LSVTEGVHSQ VQLQQSGAEL

VRPGSSVKIS CRASGYLEST FWINWVKQRP

-continued
GQGLEWIGQI YPGDGDTNYN GKFRGKATLT

ADKSSSTAYM QLSSLTSEDS AVYFCARREV

LIYDDYYDAL DYWGQGTSVT VSS
Signal peptide: 1-19
FR1: 20-49
CDR1: 50-54
FR2: 55-68
CDR2: 69-85
FR3: 86-117
CDR3: 118-132
FR4: 133-143

MAb 4G11.A3 light chain DNA sequence
SEQ ID NO: 7
ATGGATTTTC AAGTGCAGAT TTTCAGCTTC

CTGCTAATCA GTGCCTCAGT CATAATATCC

AGAGGACAAA TTGTTCTCAC CCAGTCTCCA

GCAATCATGT CTGCATCTCC AGGGGAGAAG

GTCACCATGA CCTGCAGTGC CAGCTCAAGT

GTAAATTCCA TGCACTGGTA CCAACAAAAG

TCAGGCACCT CCCCCAAAAG ATGGATTTAT

GACACATCCA AATTGGCTTC TGGAGTCCCT

GCTCGCTTCA GTGGCAGTGG GTCTGGGACC

TCTTACTCTC TCACAATCAG CAACATGGAG

-continued
GCTGAAGATG CTGCCACTTA TTACTGCCAG

CAGTGGAGTA GTAACCCGCT CACGTTCGGT

GCTGGGACCA AGCTGGACCT GAAA
Signal sequence: 1-66
FR1: 67-135
CDR1: 136-165
FR2: 166-210
CDR2: 211-231
FR3: 232-327
CDR3: 328-354
FR4: 355-384

MAb 4G11.A3 light chain amino acid sequence
SEQ ID NO: 8
MDFQVQIFSF LLISASVIIS RGQIVLTQSP

AIMSASPGEK VTMTCSASSS VNSMHWYQQK

SGTSPKRWIY DTSKLASGVP ARFSGSGSGT

SYSLTISNME AEDAATYYCQ QWSSNPLTFG

AGTKLDLK
Signal peptide: 1-22
FR1: 23-45
CDR1: 46-55
FR2: 56-70
CDR2: 71-77
FR3: 78-109
CDR3: 110-118
FR4: 119-128

---

SEQUENCE LISTING

```
Sequence total quantity: 8
SEQ ID NO: 1            moltype = DNA  length = 411
FEATURE                 Location/Qualifiers
source                  1..411
                        mol_type = genomic DNA
                        organism = Mus musculus
SEQUENCE: 1
atggctgtct tggggctgct cttctgcctg gtgacattcc caagctgtgt cctatcccag   60
gtgcagctga agcagtcagg acctggccta gtgcagccct cacagagcct gtccatcacc  120
tgcacagtct ctggtttctc attaactacc tatgctatac actgggttcg ccagtctcca  180
ggaaagggtc tagagtggct gggagtgata tggagtggtg gaaacacaga ctataatgca  240
gcttttcatat ccagactgag catcactaag gacaattcca agagccaagt tttctttaaa  300
atgaacagtc tgcaacctaa tgacacagcc atatattatt gtgccagaga ggcctctact  360
atgataacga cggactactg gggccaaggc accactctca cagtctcctc a            411

SEQ ID NO: 2            moltype = AA   length = 137
FEATURE                 Location/Qualifiers
source                  1..137
                        mol_type = protein
                        organism = Mus musculus
SEQUENCE: 2
MAVLGLLFCL VTFPSCVLSQ VQLKQSGPGL VQPSQSLSIT CTVSGFSLTT YAIHWVRQSP   60
GKGLEWLGVI WSGGNTDYNA AFISRLSITK DNSKQVFFK MNSLQPNDTA IYYCAREAST  120
MITTDYWGQG TTLTVSS                                                  137

SEQ ID NO: 3            moltype = DNA  length = 381
FEATURE                 Location/Qualifiers
source                  1..381
                        mol_type = genomic DNA
                        organism = Mus musculus
SEQUENCE: 3
atggagtcac agattcaggc atttgtattc gtgtttctct ggttgtctgg tgttgacgga   60
gacattgtga tgacccagtc tcacaaattc atgtccacat cagtaggaga tagggtcacc  120
atcacctgca gggccagtca ggatgtgagt actgctgtag cctggtatca acaaaaacca  180
ggccaatctc ctaaactact gatttactgg gcatccatcc ggcacactgg agtccctgat  240
cgcttcacag gcagtggatc tgggacagat tatactctca ccatcagcag tgtgcaggct  300
gaagacctgg cactttatta ctgtcagcaa cattatttca ctccgctcac gttcggtgct  360
gggaccaagc tggagctgaa a                                             381
```

```
SEQ ID NO: 4              moltype = AA   length = 127
FEATURE                   Location/Qualifiers
source                    1..127
                          mol_type = protein
                          organism = Mus musculus
SEQUENCE: 4
MESQIQAFVF VFLWLSGVDG DIVMTQSHKF MSTSVGDRVT ITCRASQDVS TAVAWYQQKP   60
GQSPKLLIYW ASIRHTGVPD RFTGSGSGTD YTLTISSVQA EDLALYYCQQ HYFTPLTFGA  120
GTKLELK                                                            127

SEQ ID NO: 5              moltype = DNA   length = 429
FEATURE                   Location/Qualifiers
source                    1..429
                          mol_type = genomic DNA
                          organism = Mus musculus
SEQUENCE: 5
atggaatggc cttggatctt tctcttcctc ctgtcagtaa ctgaaggtgt ccactcccag   60
gttcagctgc agcagtctgg ggctgagctg gtgaggcctg ggtcctcagt gaagatttcc  120
tgcagggctt ctggctattt attcagtacc ttctggataa actgggtgaa gcagaggcct  180
ggacagggtc ttgagtggat tggacagatt tatcctggag atggtgatac taactacaat  240
ggaaagttca gggtaaagc cacactgact gcagacaaat cctccagcac agcctacatg  300
cagctcagca gcctaacatc tgaggactct gcggtctatt tctgtgcaag aagggaagtt  360
ttgatctatg atgattacta cgatgctctg gactactggg gtcaaggaac ctcagtcacc  420
gtctcctca                                                          429

SEQ ID NO: 6              moltype = AA   length = 143
FEATURE                   Location/Qualifiers
source                    1..143
                          mol_type = protein
                          organism = Mus musculus
SEQUENCE: 6
MEWPWIFLFL LSVTEGVHSQ VQLQQSGAEL VRPGSSVKIS CRASGYLFST FWINWVKQRP   60
GQGLEWIGQI YPGDGDTNYN GKFRGKATLT ADKSSSTAYM QLSSLTSEDS AVYFCARREV  120
LIYDDYYDAL DYWGQGTSVT VSS                                          143

SEQ ID NO: 7              moltype = DNA   length = 384
FEATURE                   Location/Qualifiers
source                    1..384
                          mol_type = genomic DNA
                          organism = Mus musculus
SEQUENCE: 7
atggattttc aagtgcagat tttcagcttc ctgctaatca gtgcctcagt cataatatcc   60
agaggacaaa ttgttctcac ccagtctcca gcaatcatgt ctgcatctcc aggggagaag  120
gtcaccatga cctgcagtgc cagctcaagt gtaaattcca tgcactggta ccaacaaaag  180
tcaggcacct cccccaaaag atggatttat gacacatcca aattggcttc tggagtccct  240
gctcgcttca gtggcagtgg gtctgggacc tcttactctc tcacaatcag caacatggag  300
gctgaagatg ctgccactta ttactgccag cagtggagta gtaacccgct cacgttcggt  360
gctgggacca agctggacct gaaa                                         384

SEQ ID NO: 8              moltype = AA   length = 128
FEATURE                   Location/Qualifiers
source                    1..128
                          mol_type = protein
                          organism = Mus musculus
SEQUENCE: 8
MDFQVQIFSF LLISASVIIS RGQIVLTQSP AIMSASPGEK VTMTCSASSS VNSMHWYQQK   60
SGTSPKRWIY DTSKLASGVP ARFSGSGSGT SYSLTISNME AEDAATYYCQ QWSSNPLTFG  120
AGTKLDLK                                                           128
```

The invention claimed is:

1. An antibody that binds *M. hyopneumoniae*, wherein the antibody comprises:
   a heavy chain variable region comprising:
      amino acids 50-54 of SEQ ID NO:2,
      amino acids 69-84 of SEQ ID NO:2, and
      amino acids 117-126 of SEQ ID NO:2; and
   a light chain variable region comprising:
      amino acids 44-54 of SEQ ID NO:4,
      amino acids 70-76 of SEQ ID NO:4, and
      amino acids 109-117 of SEQ ID NO:4.

2. The antibody of claim 1, wherein the antibody is humanized.

3. The antibody of claim 1, wherein the antibody comprises an antibody fragment.

4. The antibody of claim 1, wherein the antibody is an IgG antibody.

5. The antibody of claim 1, wherein the antibody is a monoclonal antibody.

6. The antibody of claim 1, wherein the antibody is a chimeric antibody.

7. A method comprising using the antibody of claim 1 in an in vitro or in vivo diagnostic or therapeutic method.

8. The method of claim 7, wherein the method comprises detecting the presence of *M. hyopneumoniae* in a subject.

9. The method of claim 7, wherein the method comprises detecting the presence of *M. hyopneumoniae* in a sample obtained from a subject.

10. The method of claim 7, wherein the method comprises performing a magnetic bioassay or enzyme-linked immunosorbent assay (ELISA).

11. The method of claim 10, wherein the method comprises performing sandwich ELISA.

12. The method of claim 7, wherein the method comprises detecting a change in the magnetoresistance ratio (ΔMR) from a giant magnetoresistance (GMR) sensor.

13. The method of claim 12, wherein the method comprises transmitting the detected change in the magnetoresistance ratio (AMR) to a smartphone, a tablet, or a computer.

14. A composition comprising the antibody of claim 1.

15. A kit or a device comprising the antibody of claim 1.

* * * * *